(12) United States Patent
Matsuno et al.

(10) Patent No.: US 6,320,983 B1
(45) Date of Patent: Nov. 20, 2001

(54) METHOD AND APPARATUS FOR CHARACTER RECOGNITION, AND COMPUTER-READABLE RECORDING MEDIUM WITH A PROGRAM MAKING A COMPUTER EXECUTE THE METHOD RECORDED THEREIN

(75) Inventors: Hideki Matsuno; Shinichi Eguchi; Yoshihiro Nagano; Koichi Chiba; Katsutoshi Kobara, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/185,604

(22) Filed: Nov. 3, 1998

(30) Foreign Application Priority Data

Mar. 27, 1998 (JP) .................................... 10-081678

(51) Int. Cl.[7] ................................ G06K 9/18; G06K 9/72
(52) U.S. Cl. ............................................ 382/186; 382/229
(58) Field of Search ..................................... 382/137, 138, 382/140, 187, 186, 190, 189, 209, 229, 188; 705/45

(56) References Cited

U.S. PATENT DOCUMENTS

| 5,038,382 | * | 8/1991 | Lipscomb | 382/189 |
| 5,347,295 | * | 9/1994 | Agulnick et al. | 345/156 |
| 5,555,101 | * | 9/1996 | Larson et al. | 358/403 |
| 5,917,931 | * | 6/1999 | Kunkler | 382/137 |
| 6,002,799 | * | 12/1999 | Sklarew | 382/189 |

FOREIGN PATENT DOCUMENTS

| 6-309498 | 11/1994 | (JP) . |
| 8-55219 | 2/1996 | (JP) . |
| 9-62789 | 3/1997 | (JP) . |

* cited by examiner

Primary Examiner—Amelia M. Au
Assistant Examiner—Mehrdad Dastouri
(74) Attorney, Agent, or Firm—Arent Fox Kintner Plotkin & Kahn, PLLC

(57) ABSTRACT

A character recognition apparatus, in which a type of each of accounts, a type of each of marks, and characteristic data indicating a string of characters recognized when any of the marks is written in each account are previously registered for each group of the types of accounts in correlation to each other in an account-type database; a mark is estimated according to a result of verification between the account-type database and a result of ordinary character recognition according to a character recognizing program; and a type of account having the estimated mark is determined as a selected account name according to a result of recognizing characters in accounts other than the account having the mark.

31 Claims, 17 Drawing Sheets

FIG.3

| | CHARACTERISTIC | CLASSIFICATION |
|---|---|---|
| S/A | XXXXXXXX | NO-MARK |
| C/A | XXXXXXXX | |
| T/D | XXXXXXXX | |
| O/D | XXXXXXXX | |
| (S/A) | XXXXXXXX | CIRCLE |
| (C/A) | XXXXXXXX | |
| (T/D) | XXXXXXXX | |
| (O/D) | XXXXXXXX | |
| S/A | XXXXXXXX | CHECK-MARK |
| C/A | XXXXXXXX | |
| T/D | XXXXXXXX | |
| O/D | XXXXXXXX | |
| S/A | XXXXXXXX | DELETE-MARK |
| C/A | XXXXXXXX | |
| T/D | XXXXXXXX | |
| O/D | XXXXXXXX | |
| SAVINGS | XXXXXXXX | NO-MARK |
| CHECKING | XXXXXXXX | |
| TIME | XXXXXXXX | |
| OTHERS | XXXXXXXX | |
| SAVINGS | XXXXXXXX | CIRCLE |
| CHECKING | XXXXXXXX | |
| TIME | XXXXXXXX | |
| OTHERS | XXXXXXXX | |
| SAVINGS | XXXXXXXX | CHECK-MARK |
| CHECKING | XXXXXXXX | |
| TIME | XXXXXXXX | |
| OTHERS | XXXXXXXX | |
| SAVINGS | XXXXXXXX | DELETE LINE |
| CHECKING | XXXXXXXX | |
| TIME | XXXXXXXX | |
| OTHERS | XXXXXXXX | |
| 1 | XXXXXXXX | NO-MARK |
| 2 | XXXXXXXX | |
| 4 | XXXXXXXX | |
| 9 | XXXXXXXX | |
| ① | XXXXXXXX | CIRCLE |
| ② | XXXXXXXX | |
| ④ | XXXXXXXX | |
| ⑨ | XXXXXXXX | |
| 1 | XXXXXXXX | CHECK-MARK |
| 2 | XXXXXXXX | |
| 4 | XXXXXXXX | |
| 9 | XXXXXXXX | |
| 1 | XXXXXXXX | DELETE LINE |
| 2 | XXXXXXXX | |
| 4 | XXXXXXXX | |
| 9 | XXXXXXXX | |

*(Form diagram with fields: DESTINATION FOR TRANSFER, BANK / CREDIT COOPERATIVE UNION / CREDIT COOPERATIVE / AGRICULTURE UNION / OTHER COOPERATIVE, BRANCH, CHARGE, ACCOUNT TYPE (S/A, C/A, T/D, O/D), AMOUNT, ACCOUNT NUMBER, BENEFICIARY, APPLICANT — labeled 803, 803a)*

FIG.12

| ORDER | 1st PLACE | 2nd PLACE | 3rd PLACE | 4th PLACE | 5th PLACE | 6th PLACE | 7th PLACE | 8th PLACE | 9th PLACE | 10th PLACE |
|---|---|---|---|---|---|---|---|---|---|---|
| CANDIDATE | T/D | O/D | C/A | S/A | ④ | ⑨ | ② | OTHER | ① | S/A |

FIG.14

| | CHARACTERISTIC | CLASSIFICATION | POSITION |
|---|---|---|---|
| S/A | XXXXXXXX | NO-MARK | 1 |
| C/A | XXXXXXXX | | 2 |
| T/D | XXXXXXXX | | 3 |
| O/D | XXXXXXXX | | 4 |
| (S/A) | XXXXXXXX | CIRCLE | 1 |
| (C/A) | XXXXXXXX | | 2 |
| (T/D) | XXXXXXXX | | 3 |
| (O/D) | XXXXXXXX | | 4 |
| S̷/A̷ | XXXXXXXX | CHECK-MARK | 1 |
| C̷/A̷ | XXXXXXXX | | 2 |
| T̷/D̷ | XXXXXXXX | | 3 |
| O̷/D̷ | XXXXXXXX | | 4 |
| ~~S/A~~ | XXXXXXXX | DELETE LINE | 1 |
| ~~C/A~~ | XXXXXXXX | | 2 |
| ~~T/D~~ | XXXXXXXX | | 3 |
| ~~O/D~~ | XXXXXXXX | | 4 |

METHOD AND APPARATUS FOR CHARACTER RECOGNITION, AND COMPUTER-READABLE RECORDING MEDIUM WITH A PROGRAM MAKING A COMPUTER EXECUTE THE METHOD RECORDED THEREIN

FIELD OF THE INVENTION

The present invention relates to a method and apparatus for character recognition applied to a slip processor used in, for example, banks for determining an item selected by a customer from a slip according to a character recognition thereof, and to a computer-readable recognizing medium with a program making a computer execute the method of character recognition recorded therein.

BACKGROUND OF THE INVENTION

In recent years, there has been developed an image data reader such as an optical character reader (OCR device) for reading character information as image data (image) and then recognizing characters thereof, and efforts have been made to increase the efficiency of work by making use of this image data reader in various industrial fields.

For example, an operator attending at the window in a bank or the like can process jobs more efficiently by efficiently processing the slips with such an image data reader.

Especially, in order to achieve higher efficiency in jobs such as processing of slips as described above, it is required not only to process a large number of slips (hereafter a slip means the one dedicated to processing for character recognition using an image reader) of the same type, but also to automatically process slips having various types of formats.

Hereafter description is made for processing various types of slips using an image data reader with reference to FIGS. 15, 16, and 17. FIG. 15 is a simulated view showing system configuration of an ordinary slip processor, FIG. 16 is a view for explaining an example of operations in the slip processor shown in FIG. 15, and FIG. 17 is a view showing a modification of the operations in the slip processor shown in FIG. 15.

A slip processor 1000 comprises, as shown in FIG. 15, an image data reader 1001 for reading image data from a slip, an electronic computer 1002 for computing, and a hard disk 1003 for writing and reading data therein and therefrom. The image data reader 1001 is connected to the electronic computer 1002 and performs an operation for reading image data under controls provided by the electronic computer 1002. It should be noted that, for example, an image scanner or a facsimile machine may be used as this image data reader 1001.

Electronic computer 1002 as a control unit for controlling the image data reader 1001 comprises an input section 1002-1 such as a keyboard or a mouse for inputting data or the like (only a keyboard is shown in FIG. 15), a main unit of the electronic computer 1002-2 and a display 1002-3 for displaying thereon data or control information or the like. Processing for character recognition of image data read by the image data reader 1001 is performed by the main unit 1002-2 of the computer.

The hard disc 1003 is connected to the electronic computer 1002 and, as shown in FIG. 16, stores therein positional information for character data, character types and information for specifying a number of digits or the like (described as define deck information hereinafter) which are to previously be recognized for each of slip types 1003A, 1003B, 1003C, . . .

An image data reading/recognizing device 1005 as shown in FIG. 16 and FIG. 17 may also be used in place of the image data reader 1001. This image data reading/recognizing device 1005 can perform an operation for reading image data similarly to the image data reader 1001 and also execute character recognition.

Next, description is made for a case where character data described on an electricity-charge payment notice 1004 is recognized, as shown in FIG. 16, by using the image data reading/recognizing device 1005. In this case, at first, a slip type (define deck information 1003B correlated to the electricity-charge payment notice 'slip B' 1004 in this case) is specified through an operation of the input section (hereafter keyboard) 1002-1 by an operator.

Then, the electronic computer 1002 takes out the define deck information 1003B for the specified slip from the hard disk 1003 and notifies the define deck information to the image data reading/recognizing device 1005.

With those operations, the image data reading/recognizing device 1005 can perform reading of image data and character recognition thereof according to the define deck information 1003B as control information from the electronic computer 1002.

However, in the technique for processing the slip as shown in FIG. 16, It is required for an operator to specify define deck information for each slip to be read. In this technique, a heavy work load is put on the operator, and when the amount of define deck information is large the operator may make a mistake while making an instruction. Furthermore, when thousands of types of slips are required to be processed, it is practically impossible for an operator to give instructions for the processing.

For this reason, there has been proposed a method in which slips are automatically read by previously describing ID numbers ("0102" in this case) each for previously discriminating a slip different for each slip from others at a predetermined position 1004a on the slip 1004 without requiring the operator to give any instruction for a slip type.

With this method, when image data for a slip is to be read by the image data reading/recognizing device 1005, an ID number described at the predetermined position 1004a is first recognized, and define deck information (1003B in this case) correlated to the recognized ID number is used, thus character recognition being enabled.

When image data is read, however, sometimes the position at which a slip is set may be displaced from a desired position on an optical reader (e.g. a slip processor) such as the image data reader 1001 and image data reading/recognizing device 1005. In this case, for example, even when same slip as the slip with define deck information having previously been stored in the hard disk 1003 is read out, it may be determined in the slip processor that the slip is not the one having the same layout because coordinates from a reference point (physical datum point) of the image for a character data area or a graphical area or some other area are not coincident with those in the define deck information.

In the slip processor, character recognition is not performed correctly unless the layout of read image data matches with the layout of the define deck information before execution of character recognition for the image data. And for this reason, at first, a reference point of each image is extracted, comparison is made between coordinates from the reference points of the images, and then determination is made as to whether the layouts are coincident with each other or not.

As described above, when a slip is to be read by an image scanner or the like based on the conventional technology, the direction in which the slip is rotated is specified by an operator, and image data for the slip is rotated in that specified direction, and then various types of processing such as character recognition are carried out. Alternately, there is employed a method for any preset slip that particular information such as a correction mark on the slip is used and the slip is rotated in the correct direction.

When a slip is an application form for money transfer used In a bank, and if processing for character recognition is executed to the image data of a slip for which the reading direction has been changed, a type of account to be checked in relation to a method of transferring money into any other account can be identified. An image reading mechanism based on recognition by an OCR (Optical Character Reader) is generally provided for the purpose described above. Therefore, an OCR-dedicated form is used as an application form for money transfer, on which boxes for marking or character strings each for specifying an account type are printed. Those previously printed boxes or the character strings are dropped out when the image is read out, so that only the marks written by an applicant remain.

In addition to the method of determining types of bank accounts, there is a method of previously registering image of a blank slip as a firm-out system and determining, when image for the slip with marks written thereon by an applicant is read in, which type of account is to be selected from a difference between both of the images; or a method of determining which type of account is selected by using an OCR slip and by previously executing definition on a selection mark area according to using of the medium.

In the example based on the conventional technology as described above, however, an OCR system becomes an essential image reading mechanism when a selected item is checked from a slip by a marking thereon, so that preparation of a dedicated form for this mechanism becomes an indispensable requirement. When viewed from the current situation in use of the forms in banks, a number of forms to be used is enormous, which makes the cost higher as compared to that required when using an ordinary-form. Also, in order to provide the OCR-dedicated mechanism, it is required to incorporate a dedicated optical element in the mechanism, so that the number of components increases. And for this reason, cost of the apparatus as well as of the forms becomes high and in addition the mechanism can not be used for various purposes in a wide area. When the firm-out system is employed, it is required to previously register images of blank slips, the preparation may be complicated, which takes time and makes it troublesome to change images thereof whenever a specification of each form is changed.

SUMMARY OF THE INVENTION

It is an object of the present invention to provide, in order to resolve the problems in the conventional technology, a method and apparatus for character recognition which can recognize characters not only from a dedicated form but also from an ordinary form so that character recognition of a selected mark can be executed with the form not requiring the processing of drop-out, and a computer-readable recognizing medium with a program making a computer execute the character recognition method recorded therein. This allows the cost of an image reading mechanism as well as of slip-forms to be reduced and allows character recognition to be executed no matter how many different types of slips may be used.

With the invention, an item name for each of the items, a type of each of marks and a result of character recognition when a mark is written in any item are previously registered in correlation to each other in a database; a mark is estimated according to a result of verification between the database and a result of character recognition; and an item name for the item having the estimated mark is determined as a selected item name according to item names for items other than the item having the mark, so that the need for processing of drop-out is eliminated and character recognition of a selected item can be executed not only from a dedicated form but also from an ordinary form. With this feature, the cost of image reading mechanism as well as of slip-forms can be reduced, and character recognition can be executed no matter how many different types of slips may be used.

With the invention, an item name for each of the items, a type of each of marks, a result of character recognition when a mark is written in any item and information for a position where each item is placed are previously registered in correlation to each other in a database; a mark is estimated according to a result of verification between the database and a result of character recognition; an item name is extracted from the position of the estimated mark; and the extracted item name is determined as a selected item name, so that the need for processing of drop-out is eliminated and character recognition of a selected item can be executed not only from a dedicated form but also from an ordinary form. With this feature, the cost of image reading mechanism as well as of the slip-forms can be reduced, and character recognition can be executed no matter how many different types of slips may be used.

With the invention, an item name for each of the items, a type of each of the marks, and a result of character recognition when a mark is written in any item are previously registered for each group in correlation to each other in a database; a mark is estimated according to a result of verification between the database and a result of character recognition; and an item name for the item having the estimated mark is determined as a selected item name according to item names of a group including items other than the item having the mark, so that the need for processing of drop-out is eliminated and character recognition of a selected item can be executed not only from a dedicated form but also from an ordinary form. With this feature, the cost of image reading mechanism as well as of the slip-forms can be reduced, and character recognition can be executed no matter how many different types of slips may be used.

With the invention, an item name for each of the items, a type of each of marks, a result of character recognition when a mark is written in any item and information for a position where each item is placed are previously registered for each group in correlation to each other in a database; a mark is estimated according to a result of verification between the database and a result of character recognition; an item name is extracted from the position of the estimated mark; and the extracted item name is determined as a selected item name, so that the need for processing of drop-out is eliminated and character recognition of a selected item can be executed not only from a dedicated form but also from an ordinary form With this feature, the cost of image reading mechanism as well as of the slip-forms can be reduced, and character recognition can be executed no matter how different specifications of slips may be.

With the invention, items without a mark are also previously registered in the database, so that character recognition of an item without a mark can accurately be performed.

With the invention, when it is estimated that all of the plurality of items do not have a mark, determination is made that there is no selected item, so that any form on which an applicant has failed to mark can accurately be determined.

With the invention, a plurality types of marks include a selection mark indicating a selected item and an exclusion mark indicating exclusion of an item from those to be selected, and when the exclusion mark is estimated, an item name for an item other than those each having the exclusion mark is determined as a selected item name, so that it is possible to obtain a selected item name according to a result of character recognition of inputted image data as it is.

With the invention, a mark most included in a plurality of candidates for selection is estimated as a final candidate, so that estimation of a mark can easily be made from the plurality of candidates with a highest probability, and with this feature, speed of processing can be improved.

With the invention, there are provided steps for previously registering an item name for each of the items, a type of each of the marks and a result of character recognition when a mark is written in any of the item in correlation to each other in a database; estimating a mark according to a result of verification between the database and a result of character recognition; and determining an item name for the item having the estimated mark as a selected item name according to item names for items other than the item having the mark, so that the need for processing of drop-out is eliminated and character recognition of a selected item can be executed not only from a dedicated form but also from an ordinary form. With this feature, the cost of image reading mechanism as well as of the slip-forms can be reduced, and character recognition can be executed no matter how many different types of slips may be used.

With the invention, there are provided steps for previously registering an item name for each of the items, a type of each of the marks, a result of character recognition when a mark is written in any item and information for a position where each item is placed in correlation to each other in a database; estimating a mark according to a result of verification between the database and a result of character recognition; extracting an item name from the position of the mark; and determining the extracted item name as a selected item name, so that the need for processing of drop-out is eliminated and character recognition of a selected item can be executed not only from a dedicated form but also from an ordinary form. With this feature, the cost of image reading mechanism as well as of the slip-forms can be reduced, and character recognition can be executed no matter how many different types of slips may be used.

With the invention, there are provided steps for previously registering an item name for each of the items, a type of each of the marks and a result of character recognition when a mark is written in any item for each group in correlation to each other in a database; estimating a mark according to a result of verification between the database and a result of character recognition; and extracting an item name for the item having the estimated mark as a selected item name according to item names of a group including items other than the item having the mark, so that the need for processing of drop-out is eliminated and character recognition of a selected item can be executed not only from a dedicated form but also from an ordinary form. With this feature, the cost of image reading mechanism as well as of the slip-forms can be reduced, and character recognition can be executed no matter how many different types of slips may be used.

With the invention, there are provided steps for previously registering an item name for each of the items, a type of each of the marks, a result of character recognition when a mark is written in any item and information for a position where each item is arranged for each group in correlation to each other in a database; estimating a mark according to a result of verification between the database and a result of character recognition; extracting an item name from the position of the mark; and determining the extracted item name as a selected item name, so that the need for processing of drop-out is eliminated and character recognition of a selected item can be executed not only from a dedicated form but also from an ordinary form. With this feature, the cost of image reading mechanism as well as of the slip-forms can be reduced, and character recognition can be executed no matter how many different types of slips may be used.

With the invention, there are provided steps for previously registering an item name for each of the items, a type of each of the marks and a result of character recognition when a mark is written in any item in correlation to each other in a database; estimating a mark according to a result of verification between the database and a result of character recognition; and determining an item name for the item having the estimated mark as a selected item name according to item names for items other than the item having the mark, so that the need for processing of drop-out is eliminated and character recognition of a selected item can be executed not only from a dedicated form but also from an ordinary form. With this feature, the cost of image reading mechanism as well as of the slip-forms can be reduced, and character recognition can be executed no matter how many different types of slips may be used.

With the invention, there are provided steps of previously registering an item name for each of the items, a type of each of the marks, a result of character recognition when a mark is written in any item and information for a position where each item is arranged in correlation to each other in a database; estimating a mark according to a result of verification between the database and a result of character recognition; extracting an item name from the position of the mark; and determining the extracted item name as a selected item name, so that the need for processing of drop-out is eliminated and character recognition of a selected item can be executed not only from a dedicated form but also from an ordinary form. With this feature, the cost of image reading mechanism as well as of the slip-forms can be reduced, and character recognition can be executed no matter how many different types of slips may be used.

With the invention, there are provided steps for previously registering an item name for each of the items, a type of each of the marks and a result of character recognition when a mark is written in any item for each group in correlation to each other in a database; estimating a mark according to a result of verification between the database and a result of character recognition; and determining an item name for the item having the estimated mark as a selected item name according to item names in a group including items other than the item having the mark, so that the need for processing of drop-out is eliminated and character recognition of a selected item can be executed not only from a dedicated form but also from an ordinary form. With this feature, the cost of image reading mechanism as well as of the slip-forms can be reduced, and character recognition can be executed no matter how many different types of slips may be used.

With the invention, there are provided steps for previously registering an item name for each of the items, a type of each of the marks, a result of character recognition when a mark is written in any item and information for a position where each item is arranged for each group in correlation to each other in a database; estimating a mark according to a result of verification between the database and a result of character recognition; extracting an item name from the position of the mark; and determining the extracted item name as a selected item name, so that the need for processing of drop-out is eliminated and character recognition of a selected item can be executed not only from a dedicated form but also from an ordinary form. With this feature, the cost of image reading mechanism as well as of the slip-forms can be reduced, and character recognition can be executed no matter how many different types of slips may be used.

Other objects and features of this invention will become clear from the following description with reference to the accompanying drawings.

BRIEF DESCRIPTION OF THE DRAWINGS

FIG. 3 is a view showing an example of contents of a bank-account type DB in this embodiment;

FIG. 4 is a view showing an example of a format of a slip in this embodiment;

FIG. 5 is a view showing another example of a format of a slip in this embodiment;

FIG. 6 is a view showing still another example of a format of a slip in this embodiment;

FIG. 12 is a view for explaining processing for mark determination in the processing for discriminated character recognition in this embodiment;

FIG. 14 is a view showing an example of contents of the bank-account type DB according to a modification of an embodiment of the present invention;

DESCRIPTION OF THE PREFERRED EMBODIMENTS

Detailed description is made hereinafter for the preferred embodiments of a character recognition apparatus, a character recognition method, and of a computer-readable recognizing medium with a program making a computer execute the method recorded therein.

Figure 1:
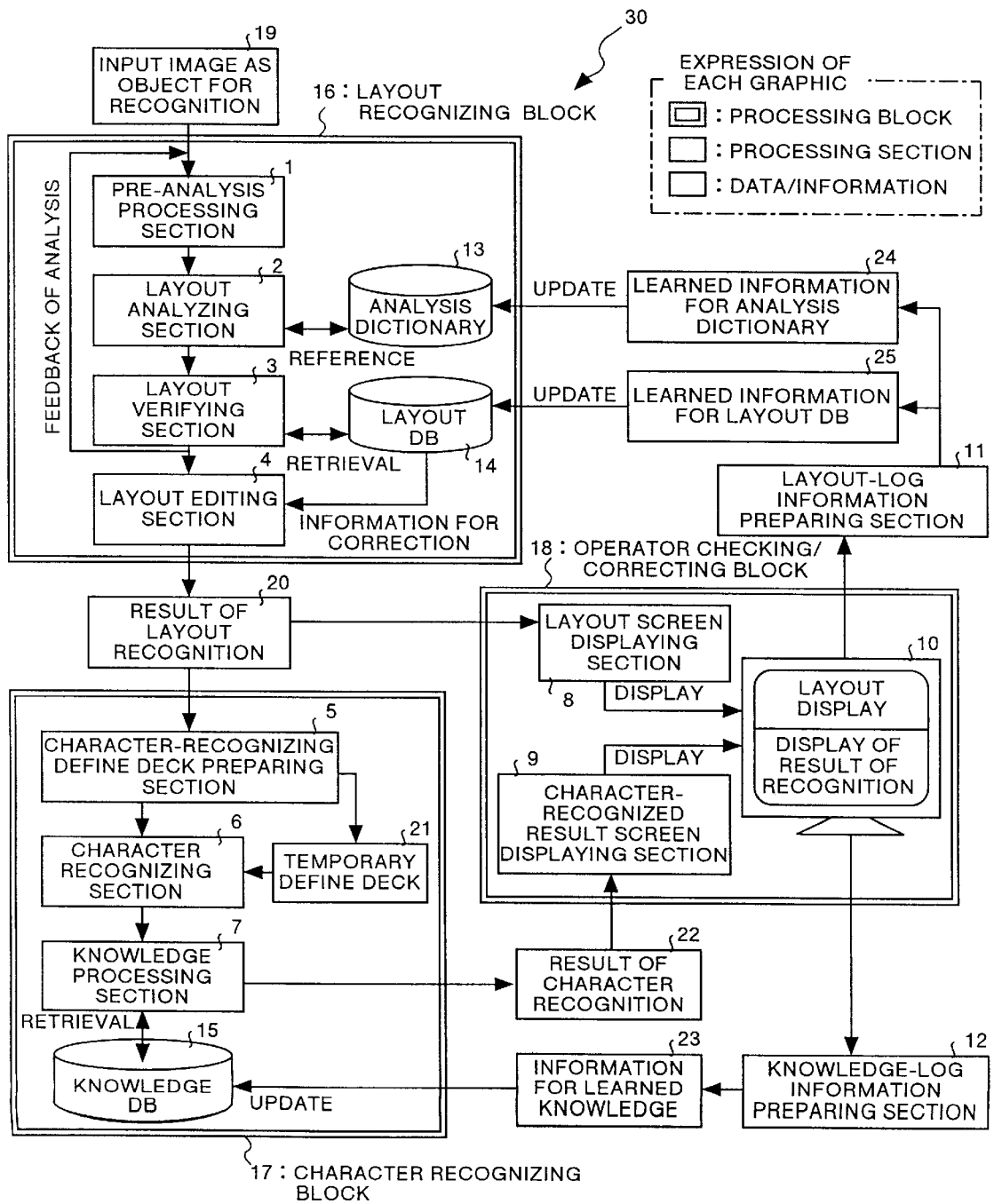
FIG. 1 is a block diagram functionally showing entire configuration of a slip processor according to an embodiment of the present invention.

At first, description is made for the configuration. FIG. 1 is a block diagram functionally showing entire configuration of a slip processor according to an embodiment of the present invention. Herein, a slip processor 30 shown in FIG. 1 recognizes the information, according to image data (image) read from slips having various types of formats like slips made privately.

The slip processor 30 comprises, for example, clients provided in each branch office (business branch office) of a bank facility and a server provided in each local center thereof connected to each other through an exchange line, and is applicable to a system for executing slip processing in each business branch office by a server in each local center by one operation.

This slip processor 30 recognizes, a format of a slip as an object for processing by analyzing a layout of image data of the slip, and executes character recognition of the slip according to a result of recognizing the format on this slip. With this, the processing of recognizing not only a slip prepared specifically for the slip processor but also a slip with information described in an arbitrary format can be executed. Herein, the slip processor 30 comprises, as shown in FIG. 1 as a functional aspect thereof, a layout recognizing block 16, a character recognizing block 17, and an operator checking/correcting block 18.

The layout recognizing block 16 executes processing for layout recognition of image data 19 read by the image data reader, and comprises a pre-analysis processing section 1, a layout analyzing section 2, a layout verifying section 3 and a layout editing section 4.

Herein, the pre-analysis processing section 1 enhances analysis precision, before processing for layout analysis, by reducing elements causing displacement of a layout. This pre-analysis processing section 1 prepares a low-density image for analysis after a format of the image data 19 as an object for recognition is changed, and also removes some dust on the image data as an element causing reduction of precision for analysis.

The layout analyzing section 2 extracts, by referring to an analysis dictionary 13, box items and item data as characteristics of a layout from the read image data, and analyzes the structure of the layout, and logically expresses the layout according to the extracted box items and item data.

The layout analyzing section 2 functions as a unit for extracting characteristics specific to a slip from read image data, and identifying a position where information to be recognized exists according to the characteristics.

The layout analyzing section 2 analyzes a layout for an image as an object for recognition, and extracts various types of structure elements (a box item and item data) constituting the layout as layout characteristics. Further, this layout analyzing section 2 prepares key information for the layout under broadly restricted conditions for the layout from the extracted layout characteristics in order to retrieve registered layout information at the time of layout verification in the layout verifying section 3 provided in a downstream section therefrom.

This layout analyzing section 2 extracts characteristics of the layout of an image, and analyzes a structure of the layout according to the extracted characteristics. Also, with extraction of characteristics of the layout, lines and box items or the like are extracted, and also layout analysis, namely table-structure analysis is executed.

Herein, when the layout has a table-structure comprising lines, a box item as a minimum rectangle formed with lines in the layout is extracted in processing for extracting the lines, and the table structure comprising box items is analyzed in processing for analyzing the table structure according to the extracted box items.

When the layout has a table-structure with no line, item data for a layout is extracted in the processing for extracting lines, and the no-line table-structure is analyzed in the processing for table structure analysis according to the extracted item data for the layout.

Furthermore, the layout analyzing section 2 is so constructed that box items and item data are extracted and then a logical origin of the layout is extracted. More specifically, the layout analyzing section 2 performs preparation of a labeled image through label processing; extraction of a logical datum point of a slip image for layout verification as well as of information for inclination thereof; extraction of line data and analysis of a table-structure comprising box items; extraction of item data, analysis of an item table-structure in a case of a table with no line, decision of a header area, and recognition of a header item; and decision of corresponding item data (processing for header analysis).

It should be noted that preparation of a labeled image by means of the label processing is the processing for computing linked elements (elements each of images linked to each other in a binary image) from inputted image data (binary image data) and preparing labeled images obtained by labeling each linked element base. Regarding this label processing, for example, "Device and Method for Extracting Connected Areas" (Japanese Patent Laid-Open Publication No. HEI 8-55219) is known.

The processing for extracting box items is processing for extracting a section with lines from data such as character strings and graphics enclosed by lines, and separating the ruled-line section from the data section. Regarding this processing for extracting box items, for example, "Image Extracting Method" (Japanese Patent Laid-Open Publication No. HEI 6-309498) is known.

Further, analysis of a header is the processing for deciding a header area (header item) in an image, recognizing information for a header item in this header area, and deciding corresponding item data.

In this embodiment, the layout analyzing section 2 discriminates a header item from item data corresponding to the header item, so that the character recognizing block 17 can immediately execute character recognition of the item data without character recognition of the header item.

The layout verifying section 3 retrieves a candidate layout from the layout database (layout DB) 14 with characteristics (box items and item data) of the layout extracted in the layout analyzing section 2 as a restricted retrieval condition. Further, this layout verifying section 3 verifies whether there is a coinciding candidate layout or not, recognizes the image at a position specified in the layout analyzing section 2, and identifies information at the specified position.

Herein, the layout DB 14 is a candidate layout storing section for storing therein candidate layout information, and stores therein candidate layout information in a compressed form as candidate layout information in this embodiment. It should be noted that detailed description is made later for the processing for compressing of the layout information in this case.

Stored in the layout DB 14 is layout correction information used for correcting a result of layout analysis in the layout analyzing section 2. In this embodiment, the layout editing section 4 described later can execute, by correcting the result of layout analysis by using this layout correction information, the subsequent processing with high precision.

Furthermore, contents of the layout DB 14 is programmed, as described later, to be updated by learning candidate layout information according to a result of processing in the layout recognizing block 16 and operator checking/correcting block 18, and this eliminates the need of registering candidate layout information to the layout DB 14 by an operator, so that simplification of the operation can be achieved.

The layout verifying section 3 verifies whether there is a coinciding candidate layout or not according to the logical datum point extracted in the layout analyzing section 2.

The layout verifying section 3 retrieves and verifies, by using layout key information prepared in the layout analyzing section 2, the layout information stored in the layout DB 14, and obtains the coinciding layout information.

The layout verifying section 3 searches, when retrieval and verification of the layout is to be executed, retrieves the layout DB 14, at first, with layout key information which is a broadly restricted condition as a restricted condition, verifies more:specifically a plurality of candidate layouts obtained through the retrieval, and decides the coinciding layout.

The layout verifying section 3 performs, when specific verification is executed to candidate layouts, verification on a bit matrix for a box item, specific verification on a position of a box item as well as on an attribute of a box item, verification on a position of item data, verification on a header position as well as header contents, and verification on characteristics data of an area image (unique image) in the order from the most broadly restricted condition among them.

Herein, the processing for verifying a bit matrix for a box item indicates verification as to whether there is a coinciding candidate layout or not in the layout DB 14 by compressing characteristics of the layout extracted in the layout analyzing section 2, and retrieving any compressed candidate layout from the layout DB 14 with the compressed characteristics of the layout as a restricted retrieval condition.

In this embodiment, the layout DB 14 stores therein compressed candidate layout information, and the layout verifying section 3 prepares compressed layout information and verifies the compressed layout information against each other, so that the processing for layout verification can be speeded up.

Furthermore, the layout editing section 4 corrects, when it is determined that a coinciding layout exists in the layout DB 14 as a result of searching and verifying the layout DB 14 In the layout verifying section 3, the result of layout analysis according to information for layout correction obtained from the layout DB 14 as described above, and then outputs the corrected information for layout correction as a result of layout recognition 20.

It should be noted that contents of correction executed by using the information for layout correction include correction to a header position as well as to contents of a header, and correction to a position of item data as well as to an attribute of item data each linked to the header.

The layout editing section 4 outputs, when it is determined that no coinciding layout exists in the layout DB 14 as a result of searching and verifying the layout DB 14 in the layout verifying section 3, the result of layout analysis as layout information (a result 20 of layout recognition) as it is.

The character recognizing block 17 executes character recognition of the result of layout recognition 20 from the layout recognizing block 16, and comprises a character-recognizing define deck preparing section 5, a character recognizing section 6, and a knowledge processing section 7.

Herein, the character-recognizing define deck preparing section 5 prepares a character-recognizing define deck (temporary define deck) 21 for defining a position as well as an attribute of item data as an object for character recognition used in the character recognizing section 6 based on the layout information outputted as the result of layout recognition 20.

Information for item data according to the result of layout recognition 20 is outputted with absolute coordinates obtained from the left upper edge of an image as an object for analysis, but the left upper edge of the image as an object for analysis is not always a constant position due to displacement of a position of a form when an image thereof is to be read out. And for this reason, the character-recognizing define deck preparing section 5 dynamically prepares character-recognizing define deck 21 matched to an image as an object for analysis for each time thereof.

The character recognizing section 6 executes character recognition of item data as an object for character recognition by using the character-recognizing define deck 21 prepared based on the layout information in the character-recognizing define deck preparing section 5, and obtains code data for a result of recognition.

Furthermore, the knowledge processing section 7 corrects the code data for the result of recognition in the character recognizing section 6, by referring to knowledge database (knowledge DB) 15 with the information for correction of the result of recognition recorded therein, and outputs the corrected code data as a result of character recognition 22.

The operator checking/correcting block 18 is a block in which the result for layout recognition 20 and the result for character recognition 22 are displayed on a terminal unit (e.g., client 10 in FIG. 1) and a result of image data processing is confirmed and corrected by an operator. This operator checking/correcting block 18 comprises a layout screen displaying section 8 and a character-recognized result screen displaying section 9.

The layout screen displaying section 8 displays, in order to correct and check the result of layout recognition 20 as well as the result of character recognition 22 executed by the operator, a result of analysis of the image as an object for recognition, header position, contents of the header and the position of the corresponding item or the like on a display of the client 10 according to the layout information for the result of layout recognition 20.

In this embodiment, for expansion of the processing for correction and checking based on the conventional technology, code data for a result of recognition is linked to contents of a header as well as to item data on the image of a corresponding slip and the linked information appears on the display of the client 10, with which the processing for correcting and checking layout information can be executed.

The character-recognized result screen displaying section 9 displays code data for a result of character recognition corresponding to items to be recognized of the image as an object for character recognition in synchronism with the display by the layout screen displaying section 8.

Furthermore, in the client 10, the result of layout recognition 20 and the result of character recognition 22 each corresponding to the image as an object for recognition having appeared on the display are checked by the operator, and correction to the result of layout recognition 20 as well as to the result of character recognition 22 is made by the operator as required.

The slip processor 30 shown in FIG. 1 also comprises a layout-log information preparing section 11 and a knowledge-log information preparing section 12 in addition to the layout recognizing block 16, character recognizing block 17, and the operator checking/correcting block 18.

The layout-log information preparing section 11 prepares information for layout correction to be stored in the layout DB 14 by adding contents corrected by the operator as corrected data to the layout information for the result of layout recognition 20 to prepare learned information 25 for the layout DB. It should be noted that the prepared layout correction information obtained by learning is registered in the layout DB 14 after the corrected contents thereof is determined.

The layout-log information preparing section 11 also prepares learned information for analysis dictionary 24 by adding contents corrected by the operator as corrected data to the layout information for the result of layout recognition 20. The prepared learned information for analysis dictionary 24 is additionally registered in an analysis dictionary 13 after the corrected contents thereof is determined.

Further, the knowledge-log information preparing section 12 prepares information for learned knowledge 23 for the knowledge DB 15 by adding contents corrected by the operator as corrected data to the code data for the result of character recognition 22. The prepared learned data is additionally registered in the knowledge DB 15.

With the configuration as described above, in the slip processor 30 according to an embodiment of the present invention, when image data 19 for a slip having an arbitrary format is read out, the layout of this image data 19 is analyzed, so that the format of the slip as an object for processing is recognized, and character recognition of the slip is executed according to a result of recognizing the format of this slip. Then, a result of layout recognition 20 and a result of character recognition 22 are checked by the operator and corrected if necessary.

Figure 2:
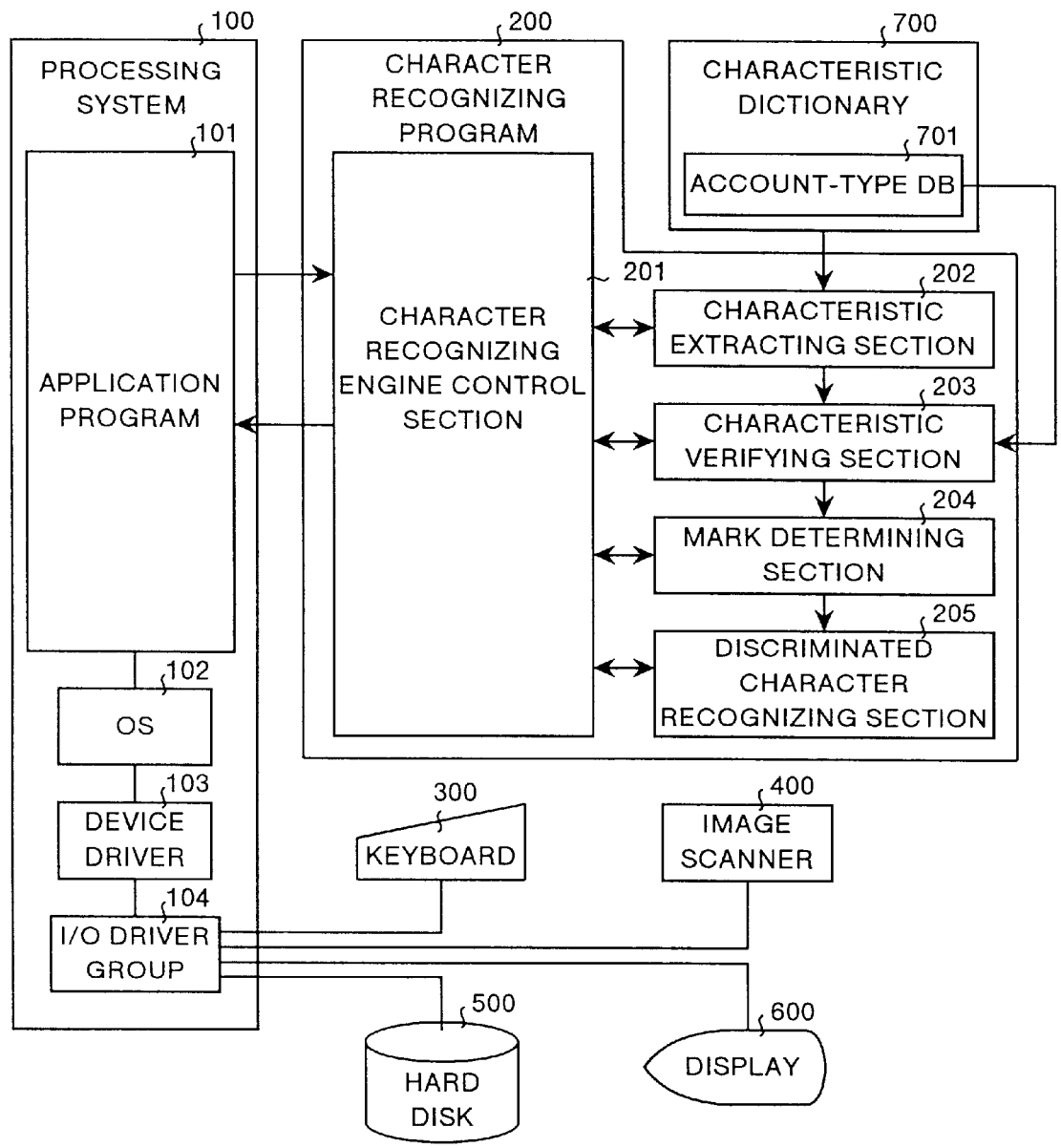
FIG. 2 is a block diagram functionally showing configuration of a character recognition apparatus applied to the slip processor according to an embodiment of the present invention.

Next, description is made more specifically for the character recognition apparatus applied to the slip processor 30. FIG. 2 is a block diagram functionally showing configuration of the character recognition apparatus applied to the slip processor according to an embodiment of the present invention. This character recognition apparatus realizes one function of the character recognizing block 17, and has a discriminated character recognizing function, in addition to an ordinary character recognizing function, for discriminating any items selected by any method from specified items to be selected previously printed on the slip. Namely, an item is selected on condition that a marking is given thereto. Description is made hereinafter only for the discriminated character recognizing function.

The character recognition apparatus has a processing system 100 for controlling an entire apparatus and a character recognizing program 200 for performing a function of recognizing items to be selected which are printed on a slip and entries to the selected items according to controls by this processing system 100. This character recognition apparatus comprises, in addition to the character recognizing program 100 and as a device supporting the character recognition, a keyboard 300 for key entry of data, a image scanner 400 for reading an image of a slip or the like, a hard disk 500 for writing therein and reading therefrom various types of data, and a display 600 for visually displaying various types of data. This character recognition apparatus further comprises a characteristic dictionary 700 having a dictionary function for character recognition in order to support the processing for the character recognizing program 200.

The processing system 100 comprises an application program 101 using the character recognizing program 200, an operating system (OS) 102 for operating this application program 101, a device driver 103 for controlling an I/O device group 104 according to controls by this OS 102, and the I/O driver group 104 for controlling input and output of various types of devices (the keyboard 300, image scanner 400, hard disk 500, and display 600) under the control by the device driver 103. This processing system 100 has a RAM, which is not shown in the figure, used as a work area during operation of various types of programs.

The character recognizing program 200 comprises a character recognizing engine control section 201, a characteristic extracting section 202, characteristic verifying section 203, a mark determining section 204, and a discriminated character recognizing section 205, and realizes the discriminated character recognizing function as described earlier. The character recognizing engine control section 201 performs a function of controlling processing for entire character recognition.

The characteristic extracting section 202 receives image data for the slip after layout recognition from the character recognizing engine control section 201, and performs a function of the processing for character recognition as ordinary character recognition by referring to the characteristic dictionary 700. Herein, the ordinary processing for character recognition indicates a processing for analyzing a shape of a character from the image data and identifying the character. As a concrete technique of this processing for character recognition, are a pattern matching and a vector analysis or the like. In this embodiment, the characteristic dictionary 700 has a dictionary function corresponding to vector analysis, and the characteristic extracting section 202 executes characteristic extraction in correlation to this function. The characteristic extracting section 202 notifies the result of the extraction, namely characteristic data on vector information to the character recognizing engine control section 201.

The characteristic verifying section 203 verifies characteristic data extracted in the characteristic extracting section 202 against an account-type DB 701 in the characteristic dictionary 700, and performs a function of identifying a type of account matching the characteristic data. Namely, the characteristic dictionary 700 registers characters each in correlation to the characteristic data. In this embodiment, a request for money transfer for a bank is taken up as an example, so that selection of a type of account is required for money transfer. As the type of account, there are four types of accounts: a savings account, a checking account, a time deposit, and other deposit accounts. The characteristic verifying section 203 extracts any of the four types of bank accounts by verifying characteristic data thereof against the characteristic dictionary 700, and notifies a result of the verification to the character recognizing engine control section 201.

The mark determining section 204 receives a result of verification in the characteristic verifying section 203 from the character recognizing engine control section 201, and performs a function of determining which type of account has been marked according to the result of the verification as well as to a previously prepared mark determining rule. The mark determining section 204 notifies a result obtained by mark determination to the character recognizing engine control section 201.

The discriminated character recognizing section 205 discriminates which type of account has been selected for each type of account according to the result of an ordinary character recognition in the characteristic extracting section 202 as well as a result of character recognition in the mark determining section 204, and performs a function of executing the processing for character recognition. This result of discriminated character re cognition obtained in the discriminated character recognizing section 205 is reported to the character recognizing engine control section 201.

It should be noted that the character recognizing engine control section 201 sends out the result of discriminated character recognition obtained from the discriminated character recognizing section 205 to the application program 101 as a result of the processing, and terminates the processing according to the function of discriminated character recognition.

Next, description is made for the account-type DB 701. FIG. 3 is a view showing a n example of contents of the account-type DB 701. As a type of account, there are a first group comprising "S/A", "C/A", "T/D", and "O/D"; a second group comprising "Savings", "Checking", "Time", and "Other"; and a third group comprising "1", "2", "4", and "9". Herein, ways of filling In the slip are previously classified so that any slip can be handled regardless of a group used in the slip or an account-type selected by the customer.

The first one is the manner in which to write a mark in a slip by making a circle around a character in an item to be selected, the second one is the manner in which to write a check-mark onto a character in an item to be selected, and the third one is the manner in which to write a delete line (a double horizontal line) onto a character in an item to be selected. It should be noted that a case where no mark is written onto any of the items to be selected is classified as no-mark. The first to third groups are stored in the account-type DB 701 in which characteristic data is correlated to each character of items to be selected which are classified into four types of marks (including no-mark) according to the classification described above.

Figure 4:
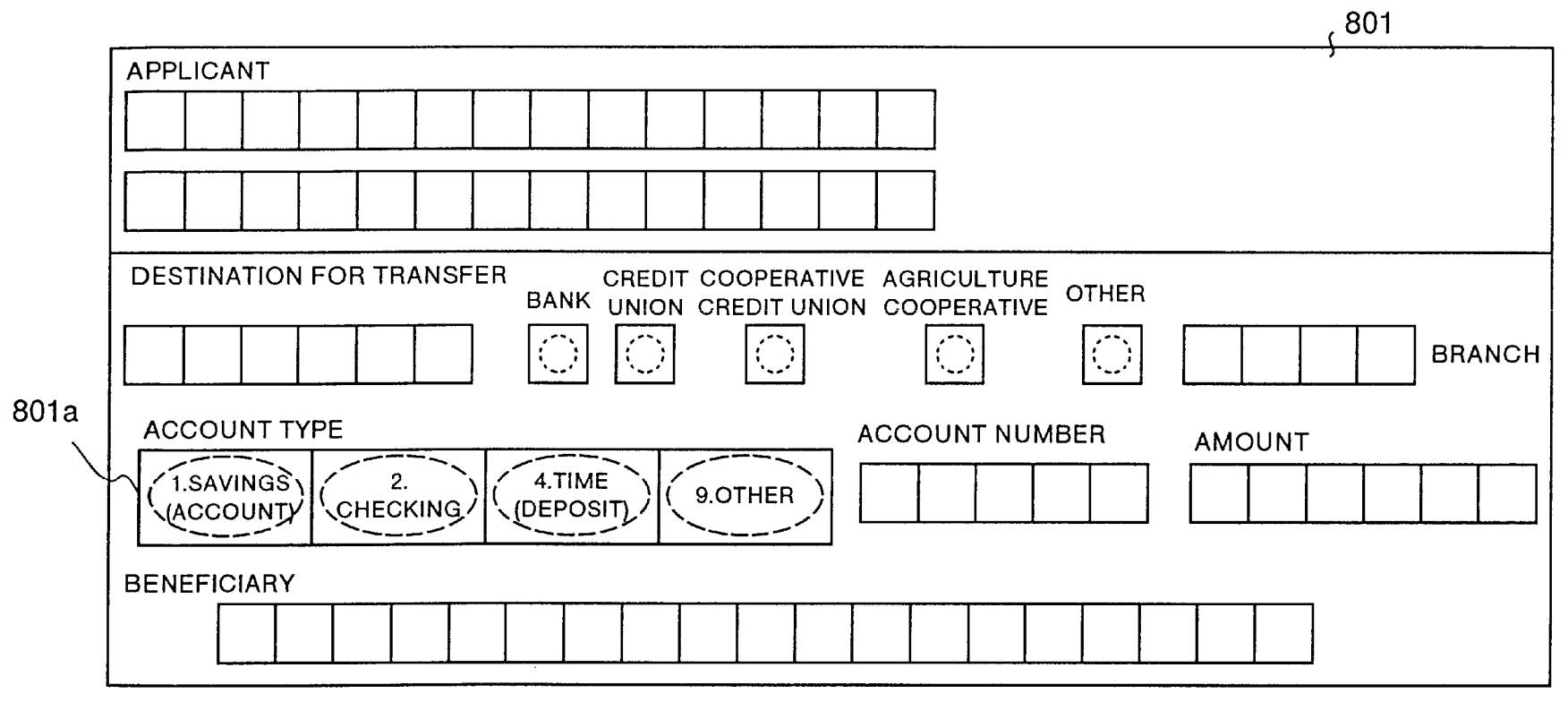
Figure 5:
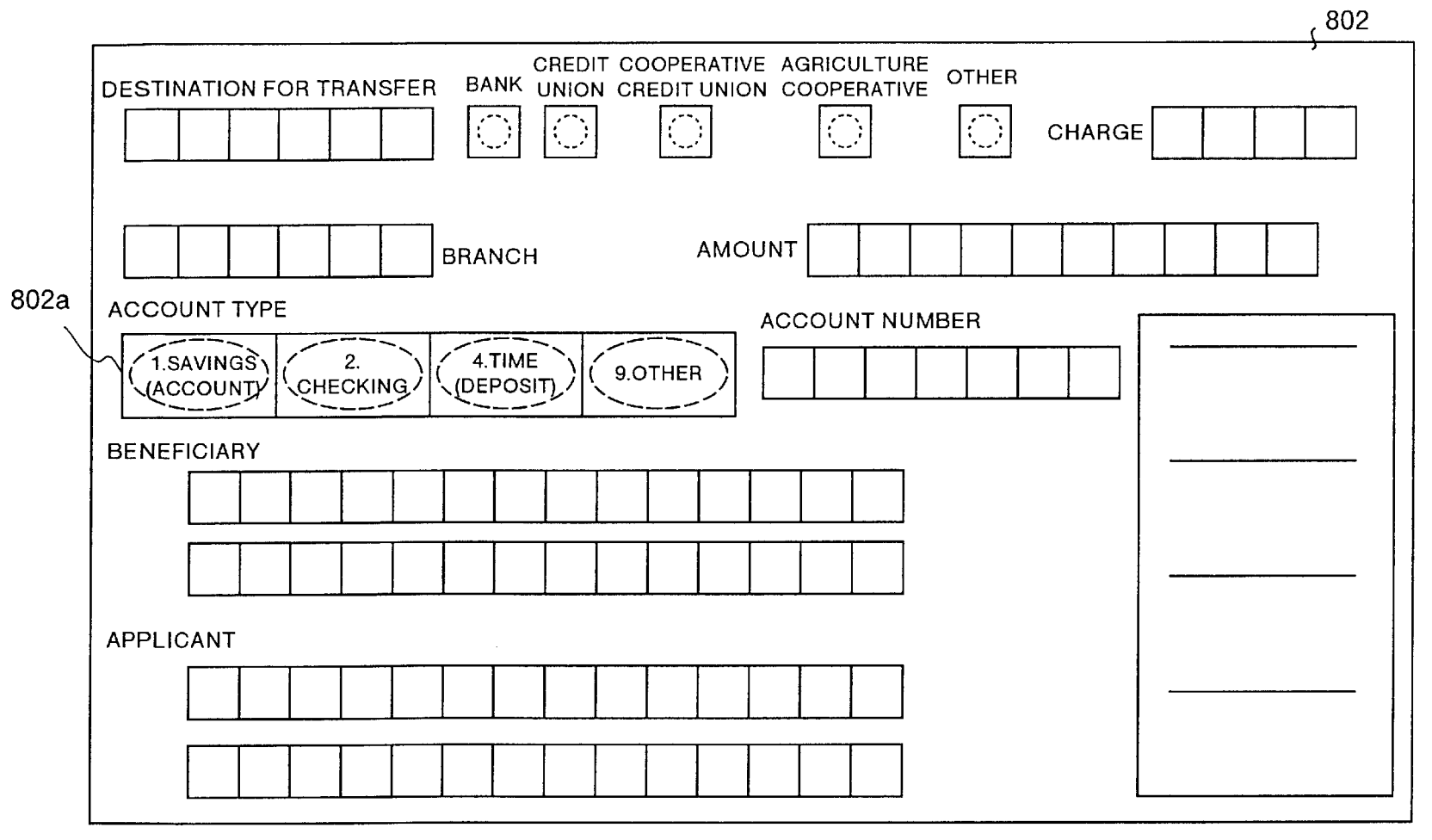

Next, description is made for types of formats of a slip used in the character recognition apparatus with reference to FIG. 4 to FIG. 6. FIG. 4, FIG. 5, and FIG. 6 are views each showing a type of format of a slip respectively.

In FIG. 4, the reference numeral 801 indicates an application for transfer which is a type of slips. Provided in the application for transfer 801, in the form of boxes are an entry column for an applicant, an entry column for a destination of transfer, and an entry column for a type of account or the like. The reference numeral 801a indicates the entry column for a type of account among the columns. This entry column for a type of account 801a is divided into four areas as an example, and "1. Savings" indicating a savings account, "2. Checking" indicating a checking account, "4. Time" indicating a time deposit, and "9. Other" indicating other deposit accounts are circled each with a dotted line and previously printed in each divided area. Namely, "1. Savings", "2. Checking", "4. Time", and "9. Other" are fixed-literals obtained by being previously printed.

When a customer is to transfer money, for example, from his savings account into any other account, the customer may just trace the circle previously printed in the header area of the entry column for a type of account 801a, so that selection of "1. Savings" printed within the circle is effected. Similarly, when money is transferred through any of the checking account, time deposit, and other deposit accounts, the requested transfer can be carried out by tracing any of the circles around "2. Checking", "4. Time", and "9. Other" each indicating contents of the account respectively.

In FIG. 5, the reference numeral 802 indicates an application for transfer having a format which is different from that of the application for transfer 801 described above. Provided in the application for transfer 802, in the form of boxes, are an entry column for a destination of transfer, an entry column for a type of account, an entry column for a beneficiary, and an entry column for an applicant or the like. The reference numeral 802a indicates the entry column for an account type among the sections. This entry column for an account type 802a is divided into four areas, as an example, which correspond to "Savings account", "Checking account", "Time deposit", and "Other deposit account" respectively, and a circle with a dotted line is previously printed within each of the divided areas. This application for transfer 802 has a format with no fixed-literal thereon, which is the difference between this application for transfer and the application for transfer 801 shown in FIG. 4.

When a customer is to transfer money, for example, from his savings account into any other account, the customer may just trace the circle previously printed in the header area of the entry column for an account type 802a, so that selection of "Savings" corresponding to the divided area where the circle has been entered is effected. Similarly, when money is transferred through any of the checking account, time deposit, and other deposit accounts, the requested transfer can be carried out by tracing any of the circles within the divided areas corresponding to the above accounts respectively.

In FIG. 6, the reference numeral 803 indicates an application for transfer having a format which is different from that of the applications for transfer 801 and 802. Provided in the application for transfer 803, in the form of boxes are an entry column for a destination of transfer, an entry column for a type of account, an entry column for a beneficiary, and an entry column for an applicant or the like. The reference numeral 803a indicates the entry column for a type of account among the columns. This entry column for an account type 803a is divided into four areas as an example, and "S/A" indicating a savings account, "C/A" indicating a checking account, "T/D" indicating a time deposit, and "O/D" indicating any other deposit account are circled each with a dotted line and previously printed in each divided area. Namely, "S/A", "C/A", "S/A", and "O/D" are fixed-literals obtained by being previously printed.

When a customer is to transfer money into any other account, for example, from his savings account, the customer may just trace the circle previously printed in the header area of the entry column for a type of account 803a, so that selection of "S/A" printed within the circle is effected. Similarly, when money is transferred through any of the checking account, time deposit, and any other deposit accounts, the requested transfer can be carried out by tracing any of the circles around "C/A", "T/D", and "O/D" each indicating contents of the account respectively.

It should be noted that there is also a case where a check-mark is written in each of the applications for transfer 801, 802, and 803 instead of tracing of the circle according to an applicant. In that case, it is determined that the marked type of account is selected like in the case of tracing the circle. In contrast, when a delete line (a double horizontal line) is written onto any character of the item to be selected, it is determined that the type of account of which character is written with the delete line is excluded from objects for selection of the items to be selected.

Figure 7:
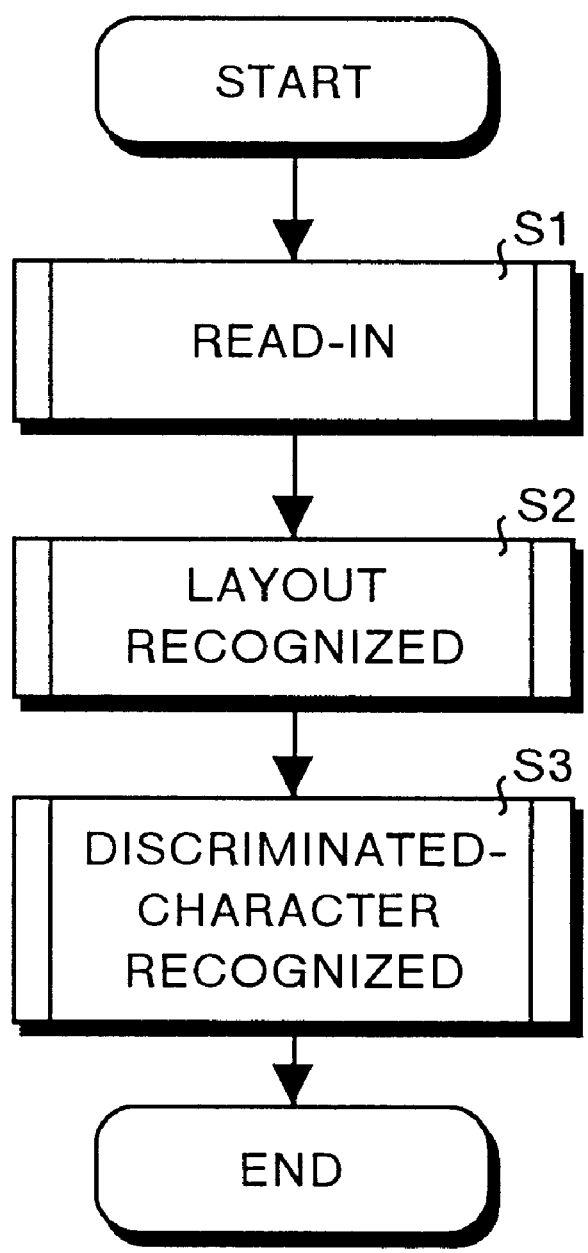
FIG. 7 is a flow chart for explaining the entire operation according to this embodiment.

Next, description is made for operations. FIG. 7 is a flow chart for explaining the entire operations according to this embodiment, FIG. 8 is a flow chart for explaining the processing for reading, FIG. 9 and FIG. 10 are flow charts each for explaining the processing for layout recognition, FIG. 11 is a flow chart for explaining the processing for discriminated character recognition, FIG. 12 is a flow chart for explaining the processing for mark determination in the processing for discriminated character recognition, and FIGS. 13A to 13F are views for explaining steps of the processing for discriminated character recognition according to an embodiment of the present invention.

At first, description is made for the entire operation with reference to FIG. 7. The entire operation shown in FIG. 7 includes operations as a slip processor 30. Namely, description for operations based on the processing for discriminated character recognition is included in the description made for the slip processing. In step S1, at first the processing for reading an image of a slip is executed, and then in step S2, the processing for layout recognition is executed based on the image data for the slip. Then, the processing for discriminated character recognition is executed according to a result of layout recognition in step S2.

Figure 8:
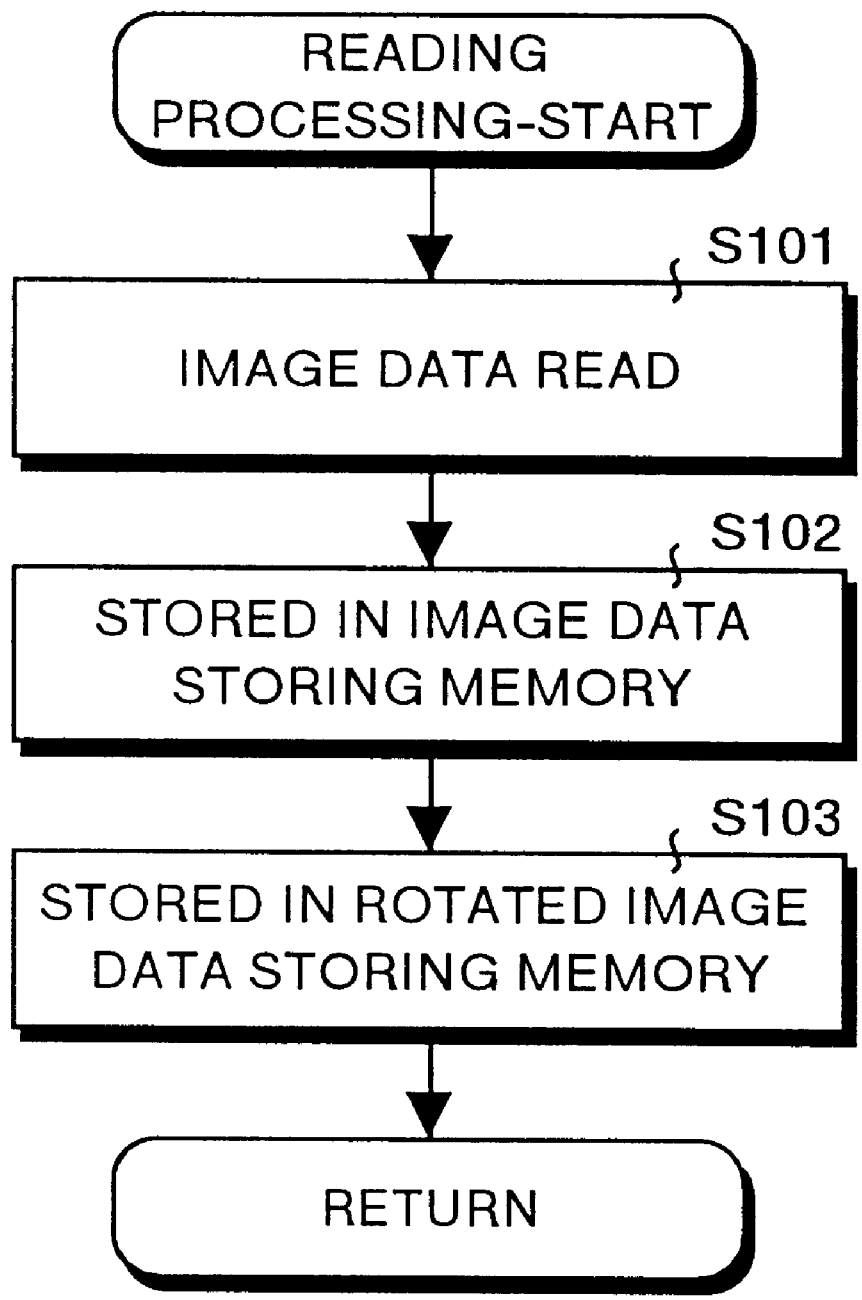
FIG. 8 is a flow chart for explaining processing for reading in this embodiment.

Next, description is made for the processing of reading in each of the operations with reference to FIG. 8. In the processing for reading, at first, image data of a slip to be processed for image recognition is read (step S101). It should be noted that the paper of a slip may be read from any direction. For example, when the slip with box items thereon is read, the read image data is once stored in an image data storing memory which is not shown in the figure (step S102), and is also stored in a rotated image data storing memory, which is also not shown in the figure, only in the first time for correcting a direction to which the form is read (step S103). As described above, the processing for reading is terminated.

Figure 9:
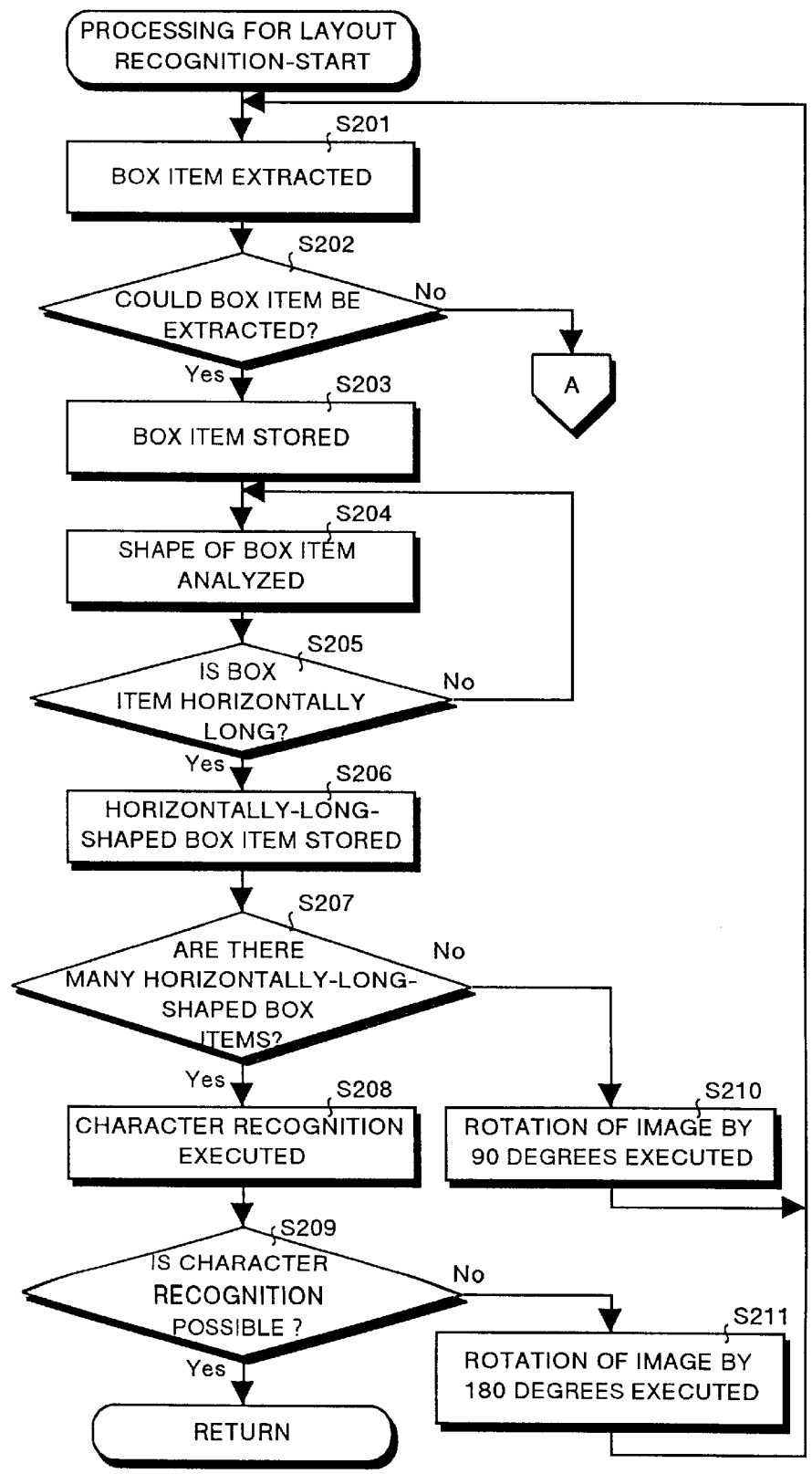
FIG. 9 is a flow chart for explaining processing for layout recognition in this embodiment.
Figure 10:
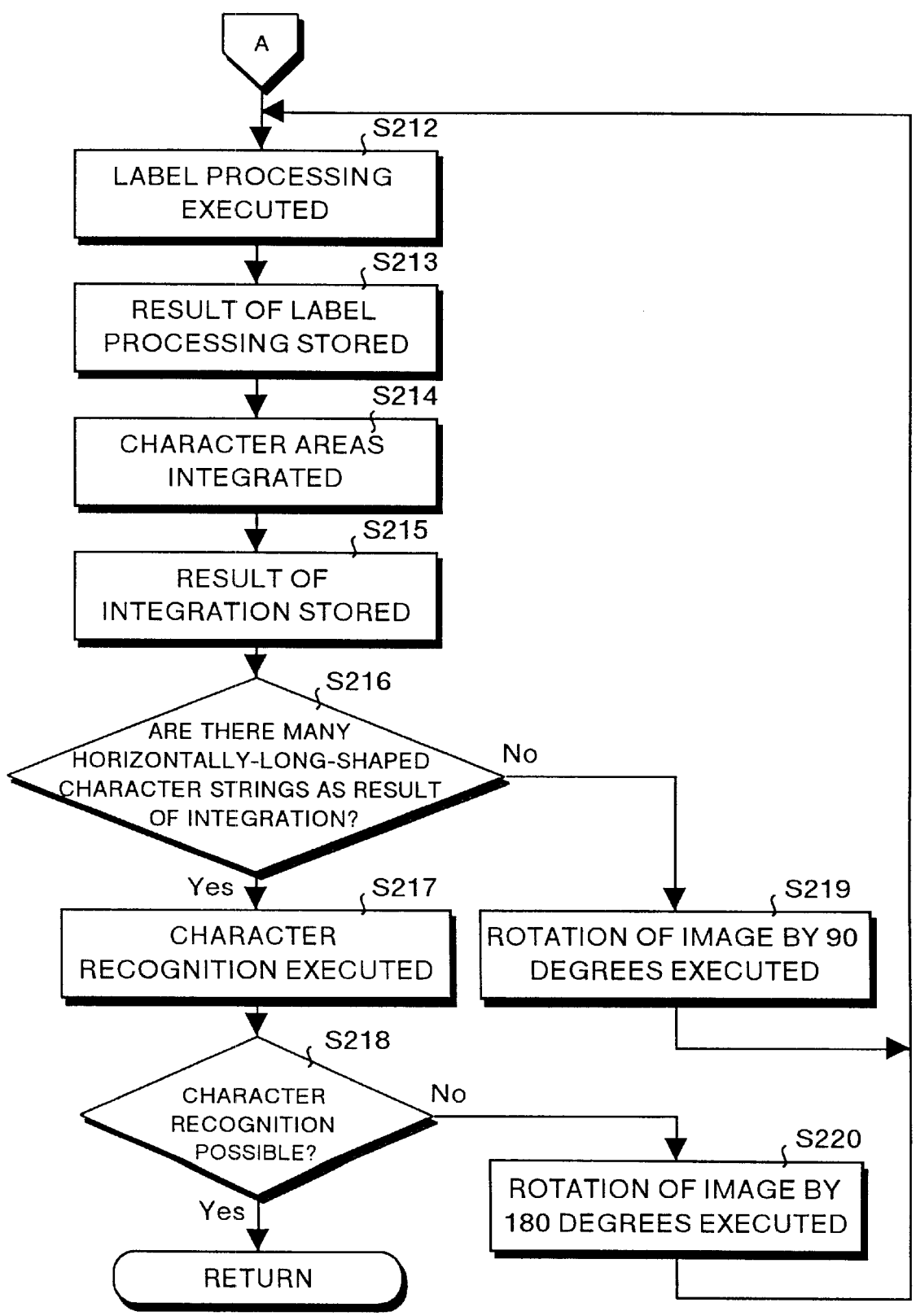
FIG. 10 is a flow chart for explaining processing for layout recognition in this embodiment.
Figure 11:
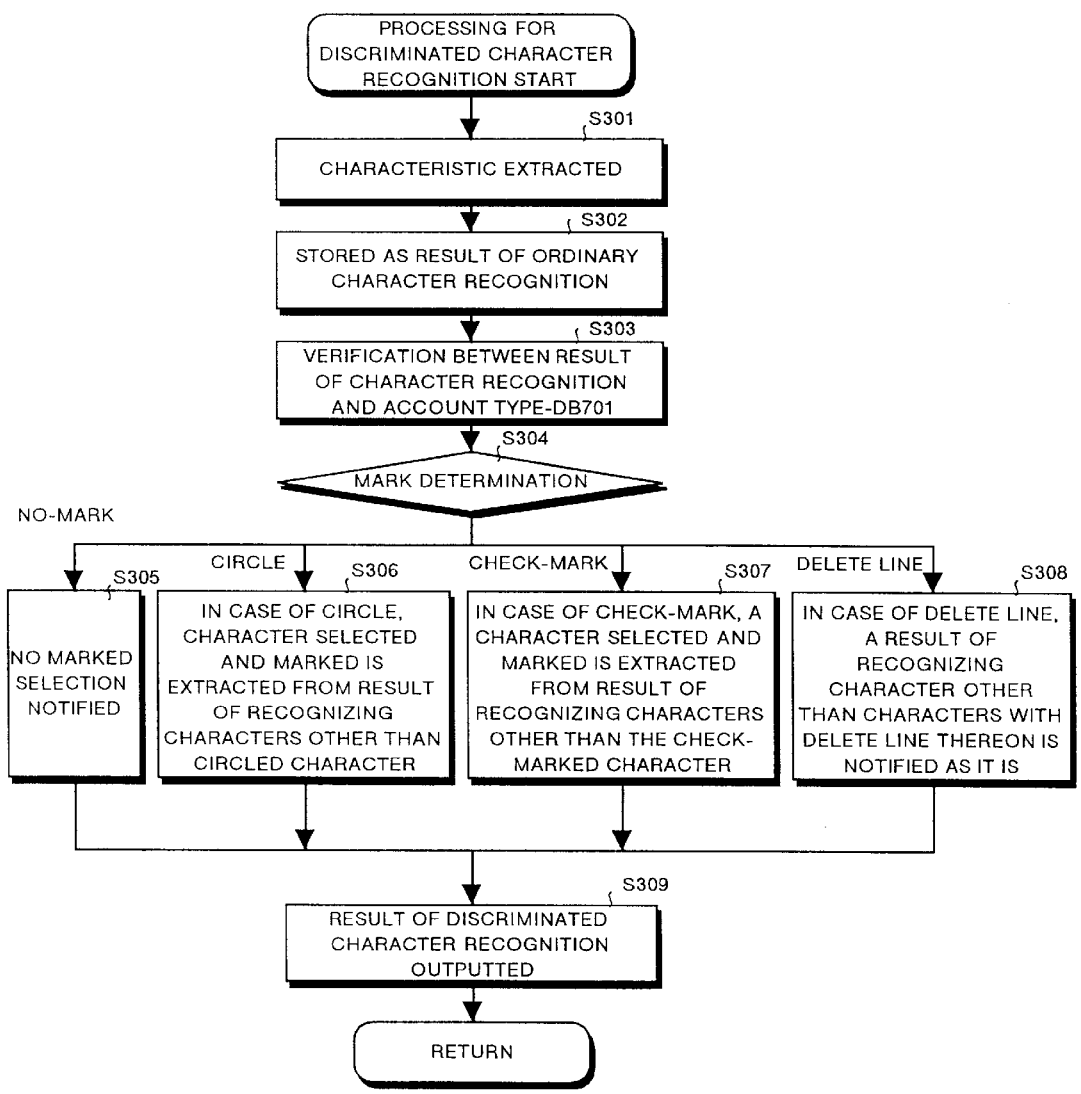
FIG. 11 is a flow chart for explaining processing for discriminated character recognition in this embodiment.

Description is made for the processing of layout recognition with reference to FIG. 9 and FIG. 10. In the processing for layout recognition, at first, box items are extracted based on the image data stored in the image data storing memory (step S201 in FIG. 9). Herein, determination is made as to whether box items have been extracted or not (step S202), and if it is determined that the box items have been extracted, the extracted box items are stored in a box item storing memory which is not shown (step S203). On the other hand, if it is determined that no box item has been extracted, the processing shifts to step S212 (Refer to FIG. 10).

When each of the box items have been extracted, in step S204, a shape of each of the box items is analyzed according to the extracted box items, and in step S205, classification is made for the box item as to whether the box item is a vertical rectangle or a horizontal rectangle. The processing in step S204 and step S205 is repeatedly executed until all the box items are classified.

As a result, information for each of the box items that is a horizontal rectangle is once stored in a horizontally-long box item memory which is not shown (step S206), and when it is determined that there are more horizontal rectangle box items than the vertical rectangle box items (step S207), character recognition is tested to horizontal rectangle box items (step S208), and if it is determined that the character recognition can be executed (step S209), the processing for layout recognition is terminated. On the other hand, when it is determined in step S207 that there are less horizontal rectangle box items, the direction to which the slip-form is read is regarded as being incorrect, and the image data stored in the image data storing memory is corrected by rotating by 90 degrees in step S210, and the image data obtained after the rotational correction thereto is stored in the rotated image data storing memory. And then, the processing returns to step S201, and the same processing is repeated.

If it is determined in step S209 that the character recognition can not be executed, it is possible that the read image is rotated by 180 degrees, so that the image data stored in the rotated image data storing memory is shifted once to the image data storing memory, and the image data shifted to this imaged data storing memory is corrected by rotating by 180 degrees. The image data after the rotational correction thereto is stored in the rotated image data storing memory (step S211). Then, the processing returns to step S201, and the same processing repeated.

When any box item has not been extracted in step S202, the processing shifts to step S212, and at first, labeling information is extracted from the image data stored in the rotated image data storing memory, and in step S213 the labeling information is stored in a labeling information memory which is not shown in the figure. Then, each of labeling in the labeling information stored in the labeling information memory is integrated into one as a character string according to a prespecified character-areas integrated rule, and item data, for example, a character string such as "an application for transfer" is extracted as a integrated result (step S214), and the extracted character string is stored in an integrated result memory which is not shown in the figure (step S215).

When it is determined that the character string as the integrated result has a larger number of character strings in the horizontal direction than that in the vertical direction (step S216), character recognition is tested to the character string (step S217), and if it is determined that the character recognition can be executed (step S218), the processing for layout recognition is terminated. On the other hand, when it is determined in step S216 that a number of character strings In the horizontal direction is smaller, the direction to which the slip-form is read is regarded as incorrect, and the image data stored in the image data storing memory is corrected by rotating by 90 degrees in step S219, and the image data obtained after the rotational correction thereto is stored in the rotated image data storing memory. And then, the processing returns to step S212, and the same processing is repeated.

If it is determined in step S218 that the character recognition can not be executed, it is possible that the read image is rotated by 180 degrees, so that the image data stored in the rotated image data storing memory is shifted once to the image data storing memory, and the image data shifted to this image data storing memory is corrected by rotating by 180 degrees. The image data after the rotational correction thereto is stored in the rotated image data storing memory (step S220). Then, the processing returns to step S212, and the same processing is repeated.

Next, description is made for the processing of discriminated character recognition with reference to FIG. 11, FIG. 12, and FIGS. 13A to 13F. This processing for discriminated character recognition is processing for recognizing a character string in the box item obtained by the processing for layout recognition, and herein, description assumes a case of recognition of a character string in the account type box which is one of box items. To make the description simpler, the application for transfer 803 shown in FIG. 6 is explained as an example. Provided in this application for transfer 803 is the account type column 803a, and determination is made as to which type of account has been selected among "S/A", "C/A", "T/D", and "O/D" each previously printed in the account type column 803a according to the processing for discriminated character recognition.

In the processing for discriminated character recognition described below, description thereof assumes a case where the account type column 803a has been extracted through the processing for layout recognition and the processing for discriminated character recognition will be executed to this extracted account type column 803a. At first, image data for the account type column 803a stored in the box item memory is read out, and ordinary character recognition is executed according to the image data (step S301). In this ordinary character recognition, characteristic data is extracted from the characteristics of the image according to the image data, and a temporary character string is recognized from verification of this extracted characteristic data against the characteristic data registered in the characteristic dictionary 700. Then, the characteristic data as a result of this character recognition is temporarily stored in a memory of the processing system 100 (step S302).

This characteristic data is verified, this time, against the account-type DB 701 in the characteristic dictionary 700 (step S303), and estimation is made from a result of the verification as to which character among the first to third groups registered in the account-type DB 701 the characteristic data corresponds to (step S304). Such an estimation is executed to all the fixed-literals previously printed in the account type column.

Figure 13A:
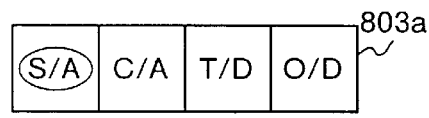
FIGS. 13A to 13F are views for explaining steps of the processing for discriminated character recognition according to an embodiment of the present invention.
Figure 13B:
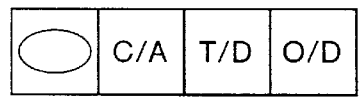

For example, when marking with a circle is made to the header character of "S/A" in the account type column 803a as shown in FIG. 13A, the image data for the circled header character of "S/A" is hard to be recognized as the image in FIG. 13B. And for this reason, candidate characters in a range from the first place to, for example, the 10th place as shown in FIG. 12 are extracted through the processing for verification in step S303. This candidate group is obtained by ranking the candidate characters in each place from one having the most similarity with the character according to the verification on the characteristic data thereof. In FIG. 12, the circled character of "T/D" appears as the first candidate, and the character of "S/A" with no circle appears as the 10th candidate. Viewed from the point of the tendency of the candidates in a range from the first place to the 10th place, all the candidates in a range from the first to ninth places are found circled characters. Namely, it is found, from the tendency of character recognition on the circled character of "S/A", that the circled characters are determined with a high recognition rate. The circled character of "S/A" is ranked in the fourth place as a candidate.

Accordingly, in step S304, from the tendency of characters appearing as candidates, namely from the tendency of marks according to the mark determining rule, estimation is made as to which mark is added to a character rather than the character itself. And for this reason, in the example in FIG. 12, the fact that the character as an object for recognition is a circled character is obtained as a result of estimation.

As described above, when it is estimated that the circled character is found in step S304, the processing shifts to step S306. In step S306, in the case of the circled character, as the circle indicates an intention of selection of the character according to regularity of discriminated character recognition under the condition of a circled character, it is determined that the circled character is the character desired by an applicant. When this circled character is estimated, determination thereof can easily be made by executing character recognition of the fixed-literals previously printed in the account type column 803*a* because it is hard to recognize the character itself separated from the circle. Namely, the fixed-literals constituting each of the first to third groups have been known, and for this reason, when character recognition is executed to the other fixed-literals other than the circled fixed-literal, which group the fixed-literals belong to can instantly be obtained. With those operations, when the group is found, the circled fixed-literal, namely the character indicating the selected account type can be extracted.

Figure 13C:
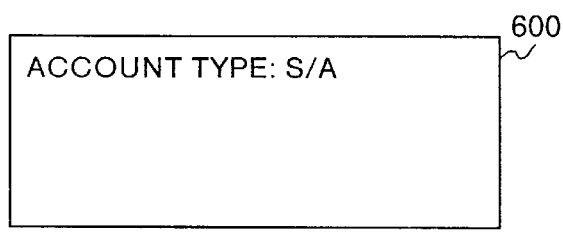

As described above, when the circled character, namely the selected account type is extracted, the extracted account type and the result of character recognition obtained in step S301 are outputted as a result of discriminated character recognition in step S309. Through this operation, "S/A" as an account type appears on a display 600 as shown in FIG. 13C.

In a case different from the example in FIG. 13A, and when no-mark is recognized for all fixed-literals within the account type column as a result of mark determination In step S304, this case is processed as absence of any selected mark in step S305, and further, all of temporary results of character recognition obtained through the character recognition in step S301 is outputted as a normal result of character recognition in step S309. In this case, as there is found no selection of a type of account, a message to that effect may be notified to the applicant by forming a screen where the message is notified on the display.

In a case different from the example in FIG. 13A, and when a check-mark is recognized as a result of mark determination in step S304, the processing shifts to step S307. In step S304, as it is also determined that the check-mark like a circle indicates an intention of selection of that type of account, the check-mark is estimated by estimating the tendency of candidates from a result of verification according to the mark determining rule. Accordingly, the same processing as that for the case where a circle is added in step S306 is executed also in S307.

Namely, the fixed-literals constituting each of the first to third groups have been known, and for this reason, when character recognition is executed to the other fixed-literals other than the check-marked fixed-literal, which group the fixed-literals belong to can instantly be obtained. With those operations, when the group is found, the check-marked fixed-literal, namely the character indicating the selected account type can be extracted.

Also, in a case different from the example in FIG. 13A, and when a delete line (a double line) is recognized as a result of mark determination in step S304, the processing shifts to step S308. In step S304, it is determined that the delete line indicates an intention of excluding that type of account from the choices, which has a meaning reverse to that of the check-mark and circle, the delete line is estimated by estimating the tendency of candidates from a result of verification according to the mark determining rule. Accordingly, any character other than characters each with a delete line thereon is extracted as a result of recognition in step S308, which is different from the cases in step S306 and step S307.

The fixed-literals constituting each of the first to third groups have been known, and for this reason, when character recognition is executed to any fixed-literal other than the fixed-literals each with a delete line thereon, which group the fixed-literal belongs to can instantly be obtained, and the selected type of account can also be obtained.

Although the application for transfer 803 shown in FIG. 6 has been explained in the example above, the processing executed therein is applicable to the other applications for transfer 801 and 802. In the case of the application for transfer 801, for example, a selected type of account in the account type column 801*a* can be determined through character recognition of the account other than the marked accounts like in the case of the application for transfer 803. Also, in the case of the application for transfer 802, fixed literals are not provided within the account type column 802*a*, but provided outside the column. In this case, a rule for character recognition is previously decided, and if any characters other than the marked character can not be recognized, the above case can be addressed by recognizing any character provided, outside of the column, at an upper side or a lower side of the area for each of the types of accounts.

Figure 13D:
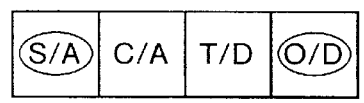
Figure 13E:
Figure 13F:
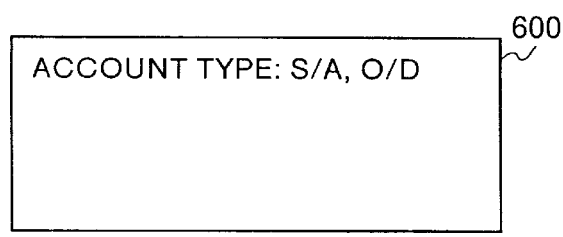
Figure 15:
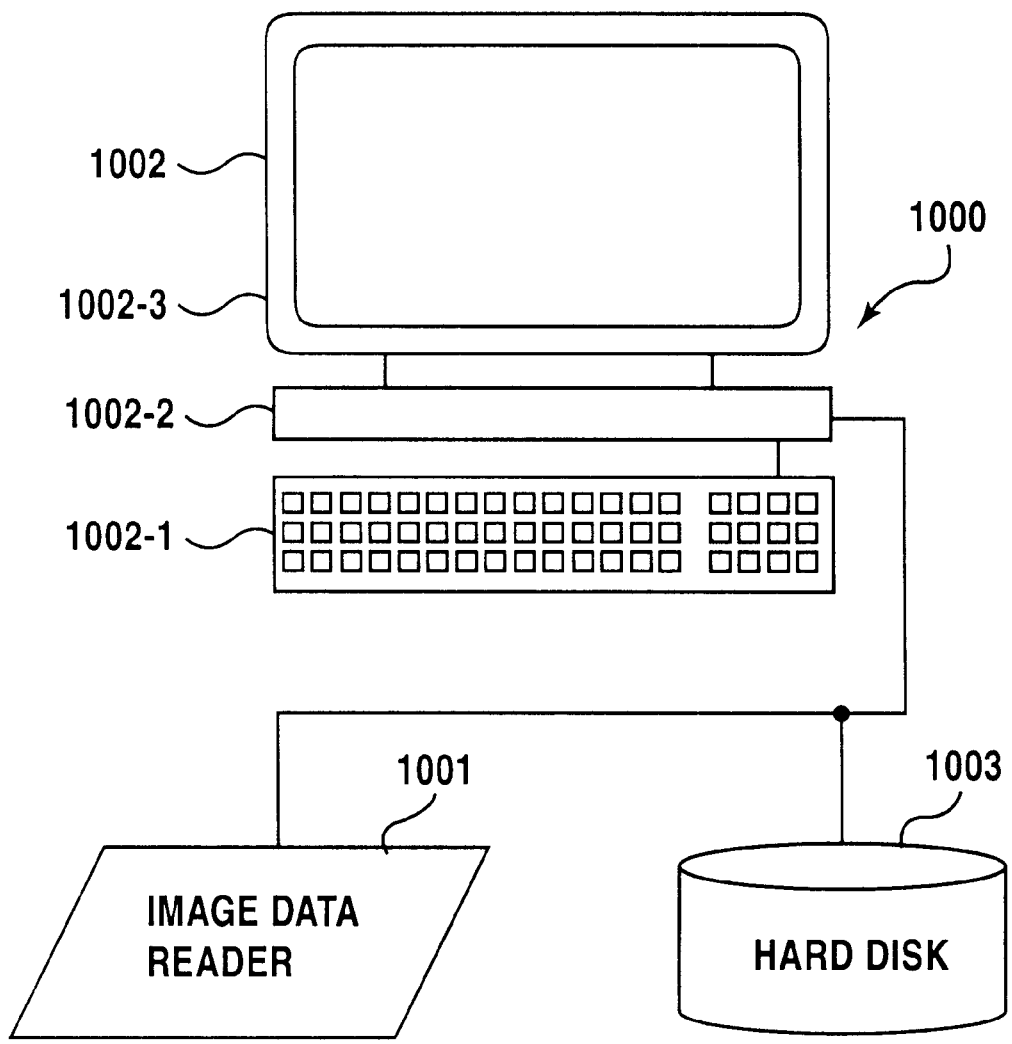
FIG. 15 is a simulated view showing system configuration of an ordinary slip processor.
Figure 16:
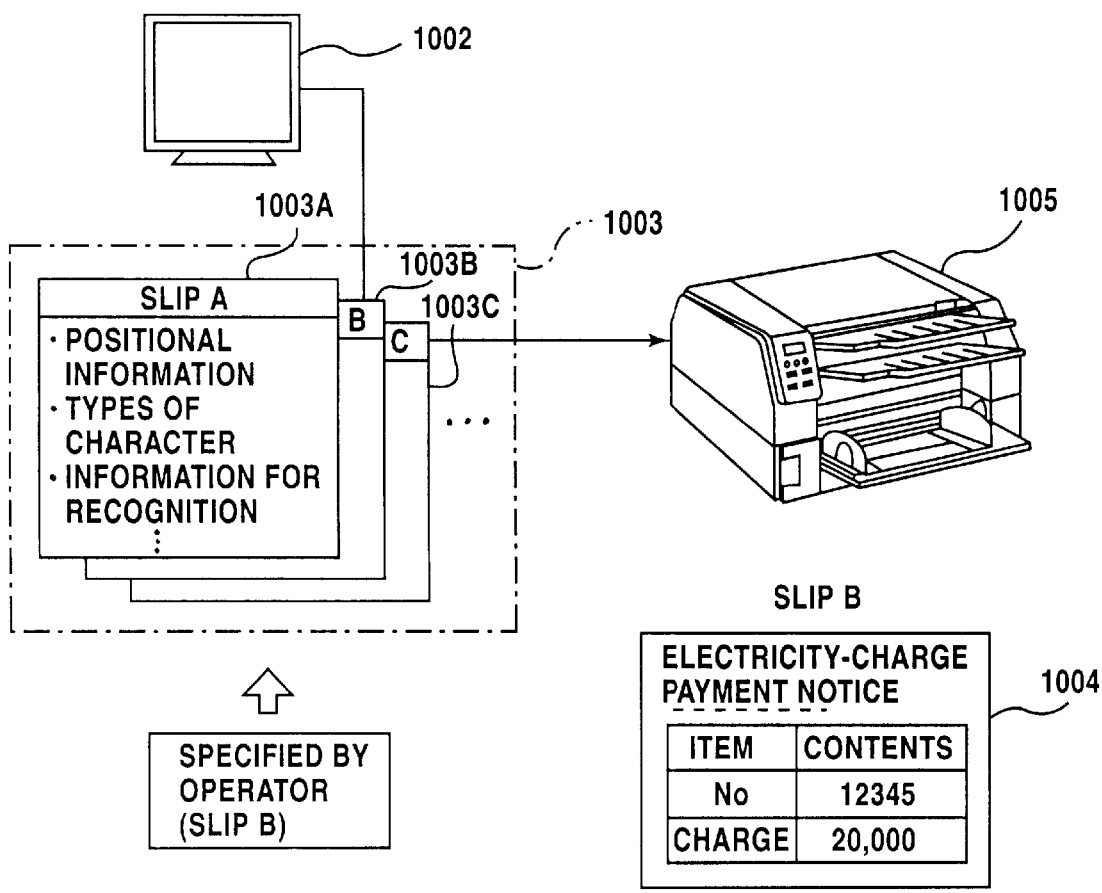
FIG. 16 is a view for explaining an example of operations in the slip processor shown in FIG. 15.
Figure 17:
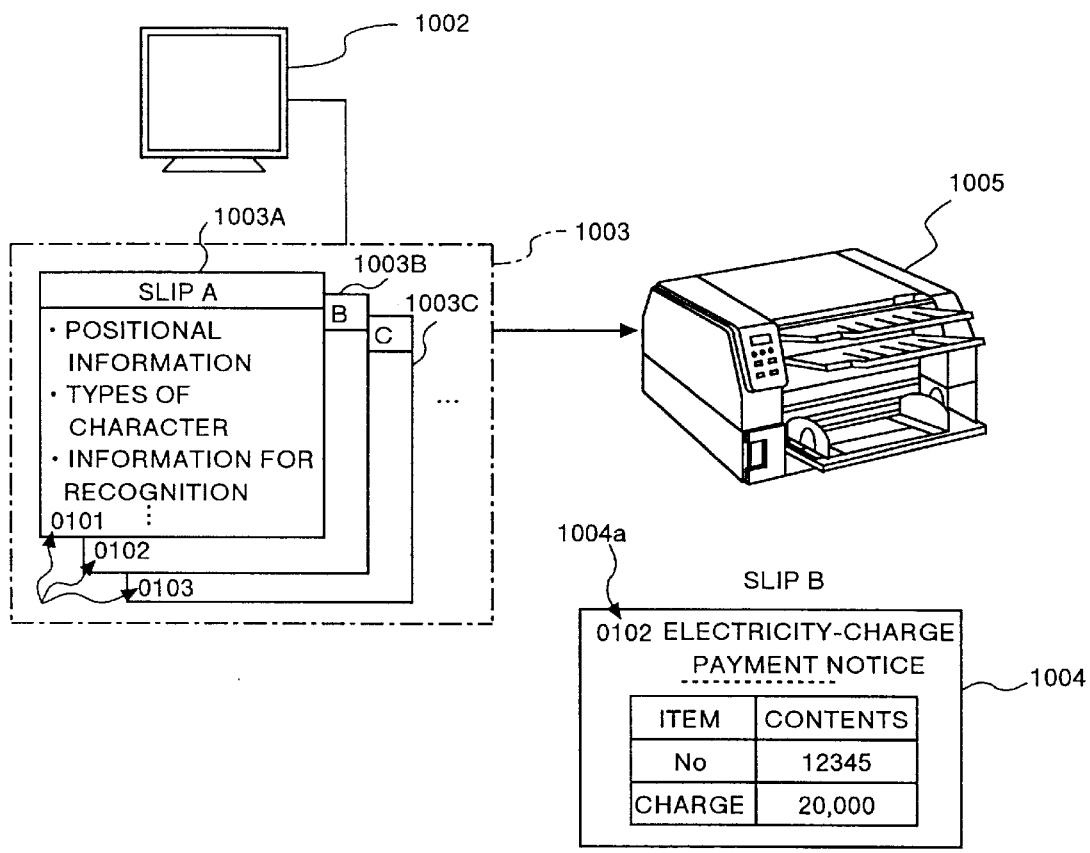
FIG. 17 is a view showing a modification of operations in the slip processor shown in FIG. 15.

The same processing is executed when marking is made to a plurality of accounts. Namely, a group is determined through recognition of characters for accounts other than the marked account, and the processing for determining the marked account is executed. Accordingly, even if marking is made to a plurality of accounts, it is possible to determine a selected account if there is at least one character of account which is not marked. As one of the examples, when the character "O/D" in addition to the character "S/A" is also circled as shown in FIG. 13D, the character recognition in positions of "S/A" and "O/D" is hard to be executed as the image in FIG. 13E. Even in this case, "S/A" and "O/D" as accounts can appear on the display 600 as shown in FIG. 13F by recognizing the other characters.

As described above, with this embodiment, the need for a character recognizing mechanism such that only marks are remained by means of the drop-out can be eliminated, in addition, preparation of a particular slip corresponding to the mechanism is not required, so that character recognition can be executed with an ordinary form. With this feature, the cost of image reading mechanism as well as of slip-forms can be reduced, and character recognition can also be executed no matter how different specifications of slips may be.

An account type with no mark thereon is also previously registered in the account-type DB 701, so that character recognition of the account with no mark can be executed without fail.

When a result of estimation that all the types of accounts do not have a mark thereon is obtained, the above case is determined as absence of any selected account, so that a form on which nothing is marked accurately be determined.

When it is estimated that a delete line is used for a mark, all the accounts other than the account/s each having the mark is/are determined as a selected account/s, so that the selected account/s can be obtained from a result of character recognition of inputted image data as it is.

A mark most included in a plurality of candidates for selection is estimated as a final candidate, so that estimation of a mark can easily be made from the plurality of candidates with a high probability, and with this feature, a recognition rate of a selected item can be improved.

Although description has been made in this embodiment for the application for transfer as a slip as an example in the field of banking facilities, the present invention is not limited to this, and is applicable to any other fields on condition that character recognition is executed to a form on which fixed-literals each indicating a choice are previously printed. The present invention is applicable to various uses, for example, an answer to a questionnaire or the like.

As types of marks in the embodiment, a circle, a delete line and a check-mark have been explained, but, the present invention is not limited to those marks, and any other marks such as "x" may be applied, and in that case, those marks may previously be registered in a database like in the account-type DB 701.

In the embodiment, a selected account is determined by executing ordinary character recognition to the types of accounts-arranged in the account type column by one operation and executing mark determination from the result thereof, but as it is determined in which place an account is marked if the regularity how the accounts are arranged is looked at, a result of verification by the characteristic verifying section 203 may be obtained according to the position of the mark. Description is made hereinafter for this matter. FIG. 14 shows a part (first group) of the contents of the accounts according to a modification of the embodiment. It should be noted that the second and third groups each have the same structure, which is omitted in FIG. 14.

Stored in the account-type DB 701 are characters indicating type of accounts, characteristic data for each of the types, and classification thereof (no-mark, a circle, a checkmark, or a delete line) in correlation to each other, but in this modification, the accounts are stored therein in correlation to the sequence thereof which is arranged from the left side as shown in FIG. 14. Namely, the accounts are arranged in the sequence of the savings account, checking account, time deposit, and any other deposit account from the left side in the account type column, so that when "S/A, C/A, T/D, O/D" are described therein, for example, information for position is given with 1, 2, 3, and 4 to "S/A", "C/A", "T/D", and "O/D" respectively. Accordingly, if it is estimated that the mark is quite possible to be given to the account provided, for example, in the first place, namely, when the marked account appears as a candidate, It is possible to estimate that the mark is given accurately to the savings account. If the type of the marks (a circle, a check-mark, a delete line) can be estimated together with the estimation of an account according to a position thereof, a selected account can be determined with a high recognition rate.

Although the invention has been described with respect to the specific embodiment and modification for a clear and a complete disclosure, the appended claims are not to be thus limited but are to be construed as embodying all modifications and alternative constructions that may occur to one skilled in the art which fairly fall within the basic teaching herein set forth.

As described above, with the invention, an item name for each of the items, a type of each of marks and a result of character recognition when a mark is written in any item are previously registered in correlation to each other in a database; a mark is estimated according to a result of verification between the database and a result of character recognition; and an item name for the item having the estimated mark is determined as a selected item name according to item names for items other than the item having the mark, so that the need for processing of drop-out is eliminated and character recognition of a selected item can be executed not only from a dedicated form but also from an ordinary form. With this feature, it is possible to obtain a character recognition apparatus in which the cost of image reading mechanism as well as of the slip-forms can be reduced and also character recognition can be executed no matter how many different types of slips may be used.

With the invention, an item name for each of the items, a type of each of marks, a result of character recognition when a mark is written in any item and information for a position where each item is placed are previously registered in correlation to each other in a database; a mark is estimated according to a result of verification between the database and a result of character recognition; an item name is extracted from the position of the estimated mark; and the extracted item name is determined as a selected item name, so that the need for processing of drop-out is eliminated and character recognition of a selected item can be executed not only from a dedicated form but also from an ordinary form. With this feature, it is possible to obtain a character recognition apparatus in which the cost of image reading mechanism as well as of the slip-forms can be reduced and also character recognition can be executed no matter how many different types of slips may be used.

With the invention, an item name for each of the items, a type of each of the marks, and a result of character recognition when a mark is written in any item are previously registered for each group in correlation to each other in a database; a mark is estimated according to a result of verification between the database and a result of character recognition; and an item name for the item having the estimated mark is determined as a selected item name according to item names of a group including items other than the item having the mark, so that the need for processing of drop-out is eliminated and character recognition of a selected item can be executed not only from a dedicated form but also from an ordinary form. With this feature, it is possible to obtain a character recognition apparatus in which the cost of image reading mechanism as well as of the slip-forms can be reduced and also character recognition can be executed no matter how many different types of slips may be used.

With the invention, an item name for each of the items, a type of each of marks, a result of character recognition when a mark is written in any item and information for a position where each item is placed are previously registered for each group in correlation to each other in a database; a mark is estimated according to a result of verification between the database and a result of character recognition; an item name is extracted from the position of the estimated mark; and the extracted item name is determined as a selected item name, so that the need for processing of drop-out is eliminated and character recognition of a selected item can be executed not only from a dedicated form but also from an ordinary form With this feature, it is possible to obtain a character recognition apparatus in which the cost of image reading mechanism as well as of the slip-forms can be reduced and also character recognition can be executed no matter how many different types of slips may be used.

With the invention, items without a mark are also previously registered in the database, so that it is possible to obtain a character recognition apparatus in which character recognition of an item without a mark can accurately be executed.

With the invention, when it is estimated that all of the plurality of items do not have a mark, determination is no selected item, so that it is possible to obtain a character recognition apparatus in which any form on which an applicant has failed to be mark can accurately be determined.

With the invention, a plurality types of mark include a selection mark indicating a selected item and an exclusion mark indicating exclusion of an item from those to be selected, and when the exclusion mark is estimated, an item name for an item other than those each having the exclusion mark is determined as a selected item name, so that it is possible to obtain a character recognition apparatus in which a selected item name can be obtained according to a result of character recognition of inputted image data as it is.

With the invention, a mark most included in a plurality of candidates for selection is estimated as a final candidate, so that it is possible to obtain a character recognition apparatus in which estimation of the mark can easily be made from the plurality of candidates with a high probability. With this feature, it is possible to obtain a character recognition apparatus in which a speed of processing can be improved.

With the invention, there are provided steps for previously registering an item name for each of the items, a type of each of the marks and a result of character recognition when a mark is written in any of the item in correlation to each other in a database; estimating a mark according to a result of verification between the database and a result of character recognition; and determining an item name for the item having the estimated mark as a selected item name according to item names for items other than the item having the mark, so that the need for processing of drop-out is eliminated and character recognition of a selected item can be executed not only from a dedicated form but also from an ordinary form. With this feature, it is possible to obtain a character recognition method with which the cost of image reading mechanism as well as of the slip-forms can be reduced and character recognition can be executed no matter how many different types of slips may be used.

With the invention, there are provided steps for previously registering an item name for each of the items, a type of each of the marks, a result of character recognition when a mark is written in any item and information for a position where each item is placed in correlation to each other in a database; estimating a mark according to a result of verification between the database and a result of character recognition; extracting an item name from the position of the mark; and determining the extracted item name as a selected item name, so that the need for processing of drop-out is eliminated and character recognition of a selected item can be executed not only from a dedicated form but also from an ordinary form. With this feature, it is possible to obtain a character recognition method with which the cost of image reading mechanism as well as of the slip-forms can be reduced and also character recognition can be executed no matter how many different types of slips may be used.

With the invention, there are provided steps for previously registering an item name for each of the items, a type of each of the marks and a result of character recognition when a mark is written in any item for each group in correlation to each other in a database; estimating a mark according to a result of verification between the database and a result of character recognition; and extracting an item name for the item having the estimated mark as a selected item name according to item names of a group including items other than the item having the mark, so that the need for processing of drop-out is eliminated and character recognition of a selected item can be executed not only from a dedicated form but also from an ordinary form. With this feature, it is possible to obtain a character recognition method with which the cost of image reading mechanism as well as of the slip-forms can be reduced and also character recognition can be executed no matter how many different types of slips may be used.

With the invention, there are provided steps for previously registering an item name for each of the items, a type of each of the marks, a result of character recognition when a mark is written in any item and information for a position where each item is arranged for each group in correlation to each other in a database; estimating a mark according to a result of verification between the database and a result of character recognition; extracting an item name from the position of the mark; and determining the extracted item name as a selected item name, so that the need for processing of drop-out is eliminated and character recognition of a selected item can be executed not only from a dedicated form but also from an ordinary form. With this feature, it is possible to obtain a character recognition method with which the cost of image reading mechanism as well as of the slip-forms can be reduced and also character recognition can be executed no matter how many different types of slips may be used.

With the invention, there are provided steps for previously registering an item name for each of the items, a type of each of the marks and a result of character recognition when a mark is written in any item in correlation to each other in a database; estimating a mark according to a result of verification between the database and a result of character recognition; and determining an item name for the item having the estimated mark as a selected item name according to item names for items other than the item having the mark, so that the need for processing of drop-out is eliminated and character recognition of a selected item can be executed not only from a dedicated form but also from an ordinary form. With this feature, it is possible to obtain a computer-readable recording medium with a program recorded therein with which the cost of image reading mechanism as well as of the slip-forms can be reduced and also character recognition can be executed no matter how many different types of slips may be used.

With the invention, there are provided steps of previously registering an item name for each of the items, a type of each of the marks, a result of character recognition when a mark is written in any item and information for a position where each item is arranged in correlation to each other in a database; estimating a mark according to a result of verification between the database and a result of character recognition; extracting an item name from the position of the mark; and determining the extracted item name as a selected item name, so that the need for processing of drop-out is eliminated and character recognition of a selected item can be executed not only from a dedicated form but also from an ordinary form. With this feature, it is possible to obtain a computer-readable recording medium with a program recorded therein with which the cost of image reading mechanism as well as of the slip-forms can be reduced and also character recognition can be executed no matter how many different types of slips may be used.

With the invention, there are provided steps for previously registering an item name for each of the items, a type of each of the marks and a result of character recognition when a mark is written in any item for each group in correlation to each other in a database; estimating a mark according to a result of verification between the database and a result of character recognition; and determining an item name for the item having the estimated mark as a selected item name according to item names in a group Including items other than the item having the mark, so that the need for processing of drop-out is eliminated and character recognition of a selected item can be executed not only from a dedicated form but also from an ordinary form. With this feature, it is possible to obtain a computer-readable recording medium with a program recorded therein with which the cost of an image reading mechanism as well as of the slip-forms can be reduced and also character recognition can be executed no matter how many different types of slips may be used.

With the invention, there are provided steps for previously registering an item name for each of the items, a type of each of the marks, a result of character recognition when a mark is written in any item and information for a position where each item is arranged for each group in correlation to each other in a database; estimating a mark according to a result of verification between the database and a result of character recognition; extracting an item name from the position of the mark; and determining the extracted item name as a selected item name, so that the need for processing of drop-out is eliminated and character recognition of a selected item can be executed not only from a dedicated form but also from an ordinary form. With this feature, it is possible to obtain a computer-readable recording medium with a program recorded therein with which the cost of an image reading mechanism as well as of the slip-forms can be reduced and also character recognition can be executed no matter how many different types of slips may be.

This application is based on Japanese patent application No. HEI 10-081678 filed in the Japanese Patent Office on Mar. 27, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A character recognition apparatus for recognizing characters based on an image data obtained by optically reading a form having a plurality of items forming one group printed thereon each expressed by a character string for selection comprising:

a database in which a plurality types of marks are previously prepared and an item name for each of the items, a type of each of the marks and a result of character recognition when each of the mark is written in each of the item are previously registered in correlation to each other;

a verifying unit for verifying the result of character recognition of the image data to those registered in said database;

an estimation unit for estimating a mark from the plurality types of marks based on the result of verification by said verifying unit; and a selected item determining unit for discriminating an item that corresponds and items that do not correspond to the mark estimated by said estimating unit while referring to said database, obtaining the item corresponding to the estimated mark based on character recognition of items that do not correspond to the estimated mark by said character recognition unit, and determining the item name corresponding to the obtained item as a selected item name.

2. A character recognition apparatus according to claim 1; wherein in said database are registered items without a mark correlated thereto previously.

3. A character recognition apparatus according to claim 1; wherein said selected item determining unit determines that no item to be selected when said estimating unit estimates that all of the items are without any mark.

4. A character recognition apparatus according to claim 1; wherein the plurality types of marks include a selection mark indicating a selected item and an exclusion mark indicating exclusion of an item from those to be selected, and said selected item determining unit determines, when the exclusion mark is estimated by said estimating unit, an item name for an item other than those each having the exclusion mark as a selected item name.

5. A character recognition apparatus according to claim 1; wherein said estimating unit extracts a plurality of candidates for selection according to a result of verification by said verifying unit and estimates a mark that occurs most frequently in the plurality of candidates as a final candidate.

6. A character recognition apparatus for recognizing characters based on an image data obtained by optically reading a form having a plurality of items forming one group printed thereon each expressed by a character string or selection comprising:

a database with an arrangement of the plurality of items previously decided according to a pre-specified order on the form, in which a plurality types of marks are previously prepared and an item name for each of the items, a type of each of the marks, result of character recognition when each of the marks is written in each of the items and information for a position where each item is arranged are previously registered in correlation to each other therein;

a verifying unit for verifying the result of character recognition of the image data to those registered in said database;

an estimation unit for estimating a mark from the plurality types of marks based on the result of verification by said verifying unit; and a selected item determining unit for extracting an item name from the plurality of item names by referring to the database according to the position of the mark estimated by said estimating unit and determining the extracted item name as a selected item name by obtaining the item corresponding to the estimated mark based on character recognition of items that do not correspond to the estimated mark by said character recognition unit.

7. A character recognition apparatus according to claim 6; wherein in said database are registered items without a mark correlated thereto previously.

8. A character recognition apparatus according to claim 6; wherein said selected item determining unit determines that no item to be selected when said estimating unit estimates that all of the items are without any mark.

9. A character recognition apparatus according to claim 6; wherein the plurality types of marks include a selection mark indicating a selected item and an exclusion mark indicating exclusion of an item from those to be selected, and said selected item determining unit determines, when the exclusion mark is estimated by said estimating unit, an item name for an item other than those each having the exclusion mark as a selected item name.

10. A character recognition apparatus according to claim 6; wherein said estimating unit extracts a plurality of candidates for selection according to a result of verification by said verifying unit and estimates a mark that occurs most frequently in the plurality of candidates as a final candidate.

11. A character recognition apparatus with a plurality of groups each comprising a plurality of items each expressed by a character string as a choice as a unit for executing character recognition according to image data obtained by optically reading a form with any of the plurality of groups printed thereon;

a database in which a plurality types of marks are previously prepared and an item name for each of the item names, a type of each of the marks and a result of character recognition when each of the marks is written in each of the items are previously registered in correlation to each other for each of the groups;

a verifying unit for verifying the result of character recognition of the image data to those registered in said database for each item;

an estimation unit for estimating a mark from the plurality types of marks based on the result of verification by said verifying unit; and a selected item determining unit for discriminating an item that has been marked with the mark estimated by said estimating unit from the items that are not marked using this mark by referring to the database, preparing item names for the items that are not marked by the mark estimated by said estimating unit by using the result of character recognition, identifying an appropriate group from the plurality of groups according to the prepared item names and determining the item name of the item that has been marked with the mark estimated by said estimating unit in the identified group as a selected item name from the prepared item names and obtaining the item corresponding to the estimated mark based on character recognition of items that do not correspond to the estimated mark by said character recognition unit.

12. A character recognition apparatus according to claim 11;

wherein in said database are registered items without a mark correlated thereto previously.

13. A character recognition apparatus according to claim 11;

wherein said selected item determining unit determines that no item to be selected when said estimating unit estimates that all of the items are without any mark.

14. A character recognition apparatus according to claim 11;

wherein the plurality types of marks include a selection mark indicating a selected item and an exclusion mark indicating exclusion of an item from those to be selected, and said selected item determining unit determines, when the exclusion mark is estimated by said estimating unit, an item name for an item other than those each having the exclusion mark as a selected item name.

15. A character recognition apparatus according to claim 11;

wherein said estimating unit extracts a plurality of candidates for selection according to a result of verification by said verifying unit and estimates a mark that occurs most frequently in the plurality of candidates as a final candidate.

16. A character recognition apparatus with a plurality of groups each comprising a plurality of items each expressed by a character string as a choice as a unit for executing character recognition according to image data obtained optically reading a form with any of the plurality of groups printed thereon;

a database in which a plurality types of marks are previously prepared and an item name for each of the item names, a type of each of the marks and a result of character recognition when each of the marks is written in each the items are previously registered in correlation to each other for each of the groups;

a verifying unit for verifying the result of character recognition of the image data to those registered in said database for each item;

a estimating unit for estimating a mark from the plurality types of marks based on the result of verification by said verifying unit; and a selected item determining unit for extracting an item name from the plurality of item names by referring to the database according to the position of a mark estimated by said estimating unit and determining the extracted item name as a selected item name and obtaining the item corresponding to the estimated mark based on character recognition of items that do not correspond to the estimated mark by said character recognition.

17. A character recognition apparatus according to claim 16;

wherein in said database are registered items without a mark correlated thereto previously.

18. A character recognition apparatus according to claim 16;

wherein said selected item determining unit determines that no item to be selected when said estimating unit estimates that all of the items are without any mark.

19. A character recognition apparatus according to claim 16;

wherein the plurality types of marks include a selection mark indicating a selected item and an exclusion mark indicating exclusion of an item from those to be selected, and said selected item determining unit determines, when the exclusion mark is estimated by said estimating unit, an item name for an item other than those each having the exclusion mark as a selected item name.

20. A character recognition apparatus according to claim 16;

wherein said estimating unit extracts a plurality of candidates for selection according to a result of verification by said verifying unit and estimates a mark that occurs most frequently in the plurality of candidates as a final candidate.

21. A character recognition method applied to a character recognition apparatus for recognizing characters based on an image data obtained by optically reading a form having a plurality of items forming one group printed thereon each expressed by a character string for selection as a group comprising the steps of:

a first step of providing a database, in which the plurality types of marks are previously prepared and an item name for each of the items, a type of each of the marks and a result of character recognition when each of the mark is written in each of the item are previously registered in correlation to each other, and verifying the result of character recognition of the image data to those registered in the database for each item;

a second step of estimating a mark from the plurality types of marks based on the result of verification in said first step; and a third step of discriminating an item that has been marked with the mark estimated in said second step from the items that are not marked using this mark by referring to the database, preparing an item name for the items that are not marked by the mark estimated in said second step by using the result of character recognition and determining the item name of the item that has been marked with the mark estimated in said second step as a selected item name from the prepared item names by obtaining the item corresponding to the estimated mark based on character recognition of items that do not correspond to the estimated mark by said character recognition.

22. A character recognition method applied to a character recognition apparatus for recognizing characters based on an image data obtained by optically reading a form having a plurality of items forming one group printed thereon each expressed by a character string for selection comprising the steps of:

a first step of providing a database, in which a plurality types of marks are previously prepared with arrangement of the plurality of items previously decided according to a prespecified order on the form, an item name for each of the items, a type of each of the marks, a result of character recognition when each of the mark is written in each of the item and information on a position where each item is arranged are previously registered in correlation to each other, and verifying the result of character recognition of the image data to those registered in the database for each item;

a second step of estimating a mark from the plurality types of marks based on the result of verification in said first step; and a third step of extracting an item name from a position of the mark estimated in said second step among the plurality of items by referring to said database and determining the extracted item name as a selected item name by obtaining the item corresponding to the estimated mark based on character recognition of items that do not correspond to the estimated mark by said character recognition.

23. A character recognition method applied to a character recognition apparatus with a plurality of groups each comprising a plurality of items each expressed by a character string as a choice as a unit for recognizing characters based on an image data obtained by optically reading a form with one of the plurality of groups printed thereon comprising the steps of:

a first step of providing a database in which a plurality types of marks are previously prepared and an item name for each of the items, a type of each of the marks and a result of character recognition when each of the mark is written in each of the items are previously registered in correlation to each other for each group, and verifying the result of character recognition of the image data to those registered in the database for each item;

a second step of estimating a mark from the plurality types of marks based on the result of verification in said first step; and a third step of discriminating an item that has been marked with the mark estimated in said second step from the items that are not marked using this mark by referring to the database, preparing an item name for the items that are not marked by the mark estimated in said second step by using the result of character recognition, identifying an appropriate group from the plurality of groups according to the prepared item names and determining the item name of the item that has been marked with the mark estimated in said second step as a selected item name from the prepared item names and obtaining the item corresponding to the estimated mark based on character recognition of items that do not correspond to the estimated mark by said character recognition.

24. A character recognition method applied to a character recognition apparatus with a plurality of groups each comprising a plurality of items each expressed by a character string as a choice as a unit for recognizing character based on an image data obtained by optically reading a form with one of the plurality of groups printed thereon comprising the steps of:

a first step of providing a database in which a plurality types of marks are previously prepared and an item name for each of the items, a type of each of the marks and a result of character recognition when each of the marks is written in each of the items are previously registered in correlation to each other for each group, and verifying the result of character recognition of the image data to those registered in the database for each item;

a second step of estimating a mark from the plurality types of marks based on the result of verification in said first step; and a third step of extracting an item name among the plurality of items from a position of the mark estimated in said second step by referring to said database and determining the extracted item name as a selected item name and obtaining the item corresponding to the estimated mark based on character recognition of items that do not correspond to the estimated mark by said character recognition.

25. A computer-readable recording medium with a program recorded therein for making a computer execute the character recognition method applied to a character recognition apparatus for recognizing characters based on an image data obtained by optically reading a form with a group comprising a plurality of items each expressed by a character string as a choice printed thereon;

said character recognition apparatus comprising a database, in which a plurality types of marks are previously prepared therein and an item name for each of the items, a type of each of the marks and a result of character recognition when each of the marks is written in each of the items are previously registered in correlation to each other;

said method comprising:

a first step of verifying the result of character recognition of the image data to those registered in the database for each item;

a second step of estimating a mark from the plurality types of marks based on the result of verification in said first step; and a third step of discriminating an item having the mark estimated in said second step among the plurality of items from those other than the item by referring to the database with item names prepared for items other than that having the mark estimated in said second step according to a result of character recognition for the image data and determining the item name of the item that has been marked with a mark estimated in said second step as a selected item name from the prepared item names and obtaining the item corresponding to the estimated mark based on character recognition of items that do not correspond to the estimated mark by said character recognition.

26. A computer-readable recording medium with a program recorded therein for making a computer execute the character recognition method applied to a character recognition apparatus for recognizing characters based on an image data obtained by optically reading a form with a group comprising a plurality of items each expressed by a character string as a choice printed thereon;

said character recognition apparatus comprising a database with arrangement of the plurality of items previously decided according to a prespecified order on the form, in which a plurality types of marks are previously prepared therein and also an item name for each of the items, a type of each of the marks, a result of character recognition when each of the marks is written in each of the items, and information for a position where each item is arranged are previously registered in previously registered in correlation to each other said method comprising:

a first step of verifying a result of character recognition of the image data to those in the database for each item;

a second step of estimating a mark from the plurality types of marks based on a result of verification in said first step; and a third step of extracting an item name from a position of the mark estimated in said second step among the plurality of items by referring to said database and determining the extracted item name as a selected item name and obtaining the item corresponding to the estimated mark based on character recognition of items that do not correspond to the estimated mark by said character recognition.

27. A computer-readable recording medium with a program recorded therein for making a computer execute the character recognition method applied to a character recognition apparatus with a plurality of groups each comprising a plurality of items each expressed by a character string as a choice as a unit for recognizing characters based on image data obtained by optically reading a form with any of the plurality of groups printed thereon;

said character recognition apparatus comprising a database, in which a plurality types of marks are previously prepared and also an item name for each of the items, a type of each of the marks, and a result of character recognition when each of the marks is written in each of the items are previously registered in correlation to each other for each group, said method comprising:

a first step of verifying a result of character recognition of the image data to those in the database for each item;

a second step of estimating a mark from the plurality types of marks based on a result of verification in said first step; and a third step of discriminating an item that has been marked with the mark estimated in said second step from the items that are not marked using this mark by referring to the database, preparing an item name for the items that are not marked by the mark estimated in said second step by using the result of character recognition, identifying an appropriate group from the plurality of groups according to the previously prepared item names and determining the item name of the item that has been marked with the mark estimated in said second step as a selected item name from the prepared item names and obtaining the item corresponding to the estimated mark based on character recognition of items that do not correspond to the estimated mark by said character recognition.

28. A computer-readable recording medium with a program recorded therein for making a computer execute the character recognition method applied to a character recognition apparatus with a plurality of groups each comprising a plurality of items each expressed by a character string as a choice as a unit for recognizing characters based on an image data obtained by optically reading a form with any of the plurality of groups printed thereon;

said character recognition apparatus comprising a database, in which a plurality types of marks are previously prepared and also an item name for each of the items, a type of each of the marks, and a result of character recognition when each of the marks is written in each of the items are previously registered in correlation to each other for each group, said method comprising:

a first step of verifying the result of character recognition of the image data to those in the database for each item;

a second step of estimating a mark from the plurality types of marks based on a result of verification in said first step; and a third step of extracting an item name from a position of the mark estimated in said second step among the plurality of items by referring to the database and determining the extracted item name as a selected item name and obtaining the item corresponding to the estimated mark based on character recognition of items that do not correspond to the estimated mark by said character recognition.

29. A character recognition apparatus for recognizing characters based on an image data obtained by optically reading a form having a plurality of items forming one group printed thereon each expressed by a character string for selection comprising:

a scanner for reading a form having a plurality of items forming a group printed thereon;

a character recognition unit for recognizing characters based on the image data obtained by said scanner;

a database in which a plurality of types of marks are previously prepared and an item name for each of the items, a type of each of the marks and a result of character recognition when each of the mark is written in each of the item are previously registered in correlation to each other;

a verifying unit for verifying the result of character recognition of the image data to those registered in said database;

an estimation unit for estimating a mark from the plurality types of marks based on the result of verification by said verifying unit; and a selected item determining unit for discriminating an item that corresponds and items that do not correspond to the mark estimated by said estimating unit while referring to said database, obtaining the item corresponding to the estimated mark based on character recognition of items that do not correspond to the estimated mark by said character recognition unit, and determining the item name corresponding to the obtained item as a selected item name.

30. A character recognition apparatus for recognizing characters based on an image data obtained by optically reading a form having a plurality of items forming one group printed thereon each expressed by a character string for selection comprising:

a scanner for reading a form having a plurality of items forming a group printed thereon;

a character recognition unit for recognizing characters based on the image data obtained by said scanner;

a database with an arrangement of the plurality of items previously decided according to a pre-specified order on the form, in which a plurality types of marks are previously prepared and an item name for each of the items, a type of each of the marks, result of character recognition when each of the marks is written in each of the items and information for a position where each item is arranged are previously registered in correlation to each other therein;

a verifying unit for verifying the result of character recognition of the image data to those registered in said database;

an estimation unit for estimating a mark from the plurality types of marks based on the result of verification by said verifying unit; and a selected item determining unit for extracting an item name from the plurality of item names by referring to the database according to the position of the mark estimated by said estimating unit and determining the extracted item name as a selected item name by obtaining the item corresponding to the estimated mark based on character recognition of items that do not correspond to the estimated mark by said character recognition unit.

31. A character recognition apparatus with a plurality of groups each comprising a plurality of items each expressed by a character string as a choice as a unit for executing character recognition according to image data obtained by optically reading a form with any of the plurality of groups printed thereon;

a scanner for reading a form having a plurality of items forming a group printed thereon;

a character recognition unit for recognizing characters based on the image data obtained by said scanner a database in which a plurality types of marks are previously prepared and an item name for each of the item names, a type of each of the marks and a result of character recognition when each of the marks is written in each of the items are previously registered in correlation to each other for each of the groups;

a verifying unit for verifying the result of character recognition of the image data to those registered in said database for each item;

an estimation unit for estimating a mark from the plurality types of marks based on the result of verification by said verifying unit; and a selected item determining unit for discriminating an item that has been marked with the mark estimated by said estimating unit from the items that are not marked using this mark by referring to the database, preparing item names for the items that are not marked by the mark estimated by said estimating unit by using the result of character recognition, identifying an appropriate group from the plurality of groups according to the prepared item names and determining the item name of the item that has been marked with the mark estimated by said estimating unit in the identified group as a selected item name from the prepared item names by obtaining the item corresponding to the estimated mark based on character recognition of items that do not correspond to the estimated mark by said character recognition unit.

* * * * *